United States Patent
Watanabe

(10) Patent No.: US 7,128,426 B2
(45) Date of Patent: *Oct. 31, 2006

(54) METHOD OF PRODUCING IMAGE DISPLAY DEVICE AND IMAGE PROJECTOR APPARATUS

(75) Inventor: Shinya Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 11/188,516

(22) Filed: Jul. 19, 2005

(65) Prior Publication Data

US 2005/0253975 A1    Nov. 17, 2005

Related U.S. Application Data

(63) Continuation of application No. 10/471,382, filed as application No. PCT/JP03/00483 on Jan. 21, 2003.

(30) Foreign Application Priority Data

Jan. 23, 2002    (JP)    ............................ 2002-13612

(51) Int. Cl.
  *G03B 21/14*    (2006.01)
  *G02F 1/1335*    (2006.01)

(52) U.S. Cl. .................... 353/122; 353/84; 349/5; 349/64; 349/95

(58) Field of Classification Search ............ 349/5, 349/7, 8, 9, 64, 162, 84, 89, 90, 94, 95, 104, 349/105, 107, 112, 158–160; 353/32, 30, 353/20, 31, 33, 34, 84, 97, 121, 122

See application file for complete search history.

(56) References Cited

U.S. PATENT DOCUMENTS 4,856,869 A    8/1989    Sakata et al.
5,225,920 A *    7/1993    Kasazumi et al. ............. 349/1
5,317,435 A *    5/1994    Kasazumi et al. ............. 349/2
5,682,265 A *    10/1997    Farn et al. .................. 359/571
6,375,328 B1*    4/2002    Hashizume et al. .......... 353/30
6,577,429 B1*    6/2003    Kurtz et al. ................ 359/279
6,791,739 B1*    9/2004    Ramanujan et al. ........ 359/279
2001/0048493 A1*    12/2001    Swanson et al. ............. 349/62
2002/0001109 A1*    1/2002    Hamano et al. ............... 359/9

FOREIGN PATENT DOCUMENTS

| JP | 6-52351 | 7/1994 |
| JP | 06-052351 | 7/1994 |
| JP | 10-253977 | 9/1998 |
| WO | WO 00/48037 | 8/2000 |

* cited by examiner

*Primary Examiner*—W. B. Perkey
*Assistant Examiner*—Andrew Sever
(74) *Attorney, Agent, or Firm*—Robert J. Depke; Trexler, Bushnell, Giangiorgi, Blackstone & Marr, Ltd.

(57) ABSTRACT

A method of producing an image display device used for an LCD projector by providing a periodic structure of pixels arranged in a matrix and a substrate supporting the pixels, modulating light entering from an entrance surface in pixel units, and emitting the same from an exit surface. A phase shift structure for randomly changing the phase of the light is formed on a surface of the substrate. The phase shift structure has a relief structure formed, for example, by etching the surface of the substrate through which light passes to random depths. Therefore, occurrence of high-order diffracted light caused by the periodic structure of very fine pixels is prevented, and accordingly the amount of 0th order light inherently required is increased.

10 Claims, 28 Drawing Sheets

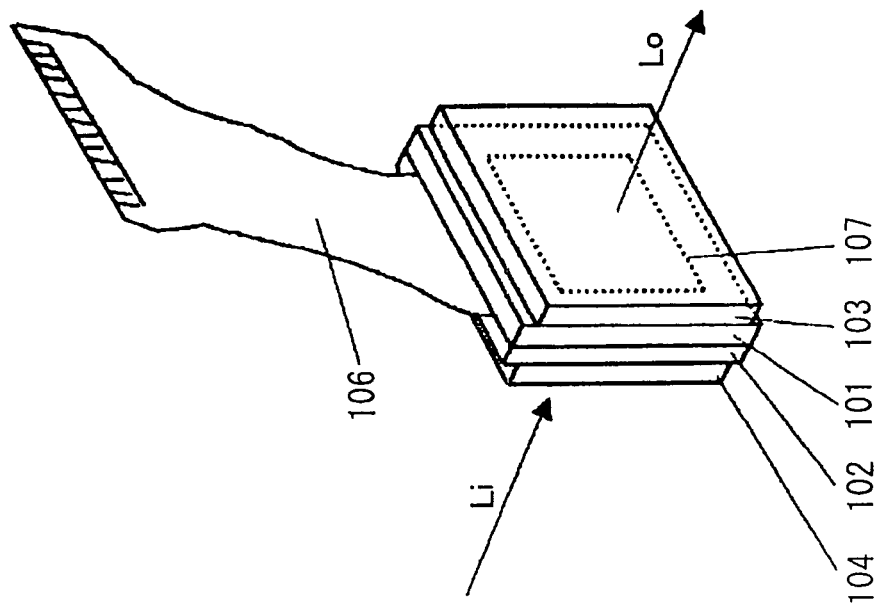
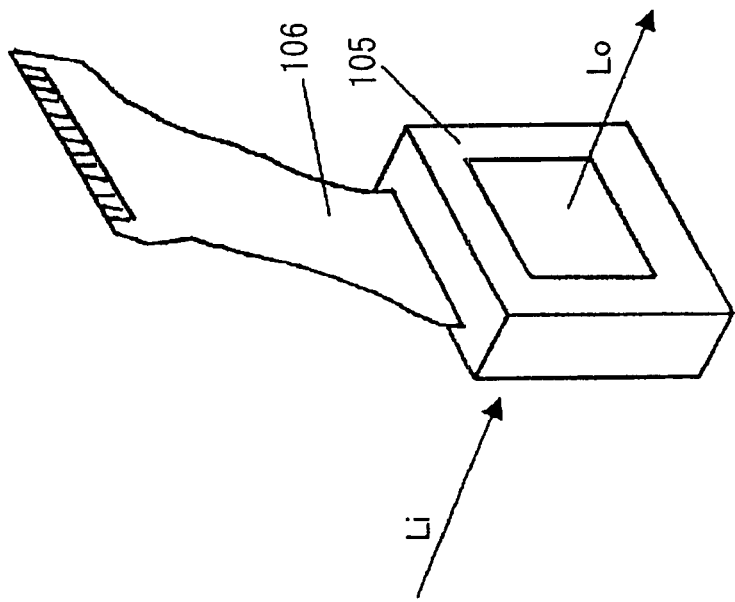

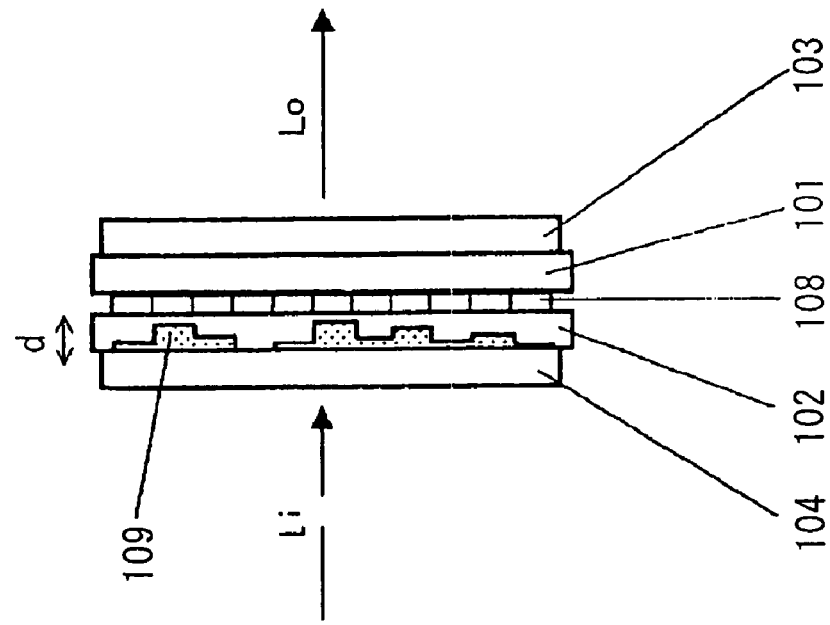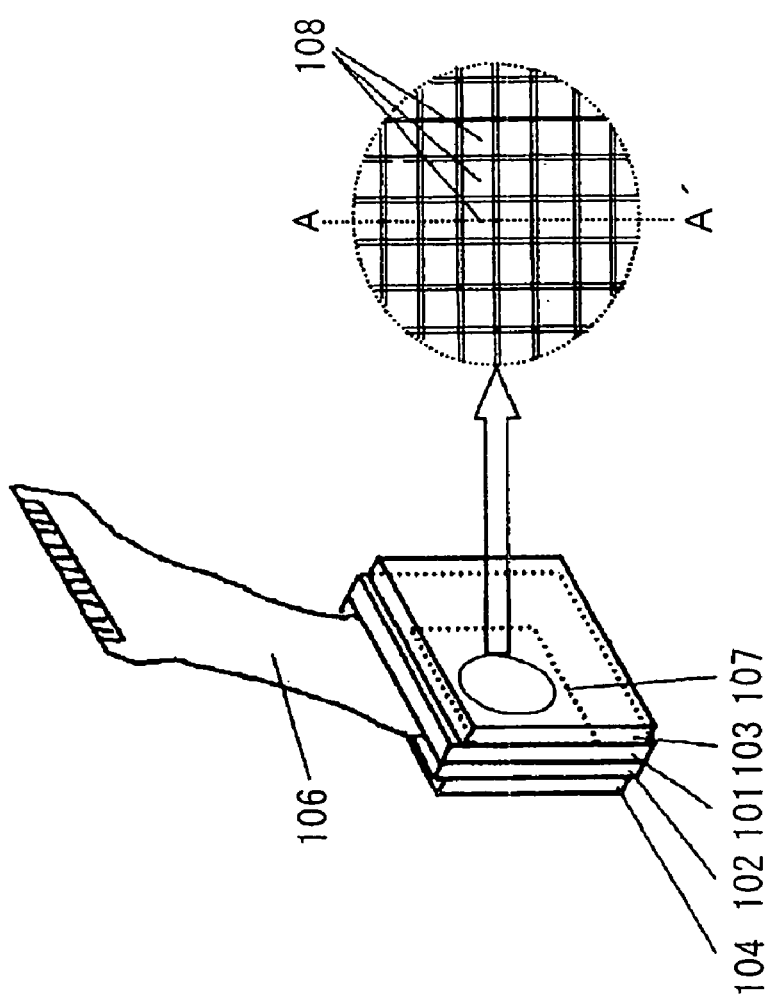

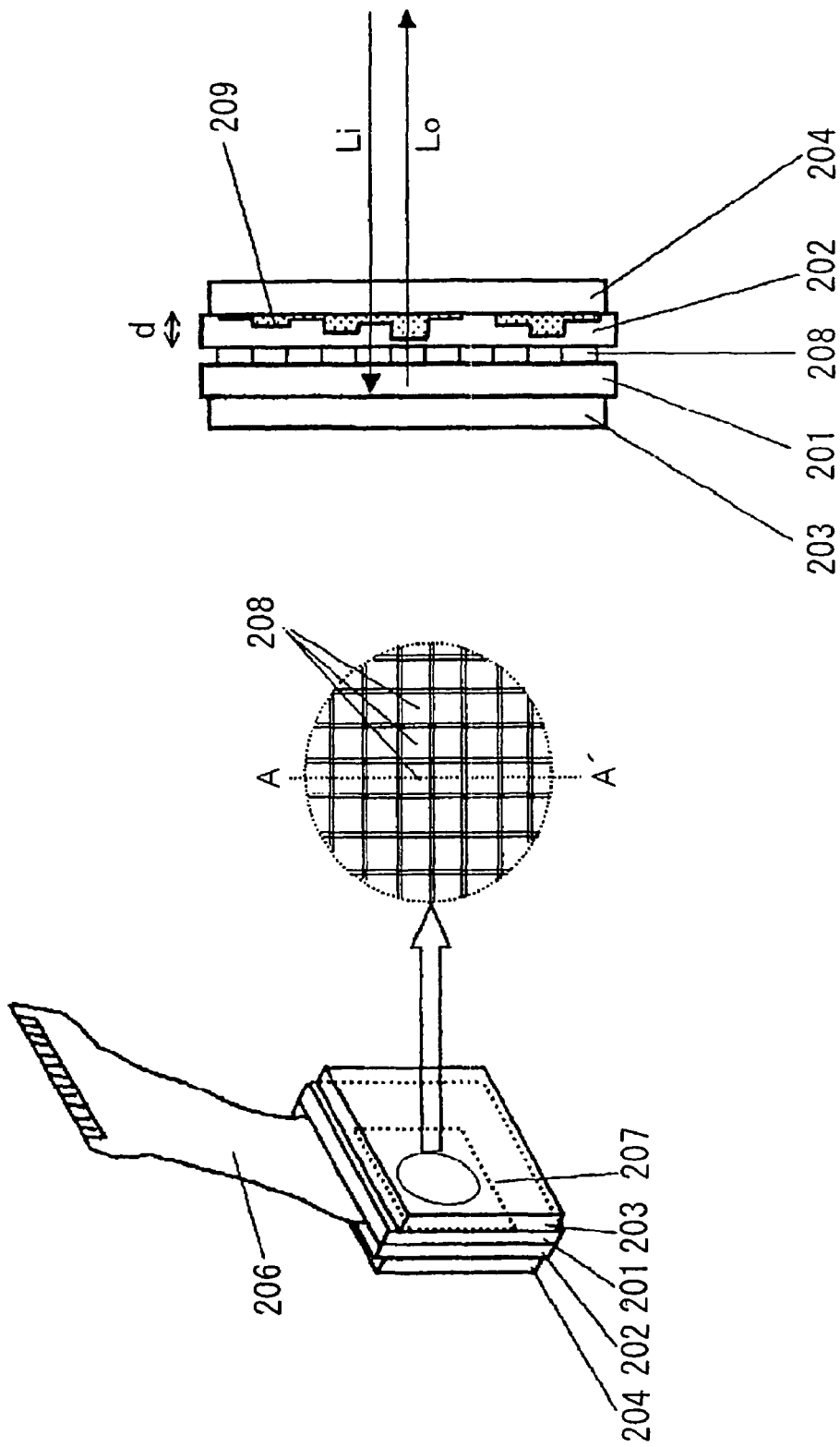

EXPOSURE

RESIST REMOVAL

UV LIGHT EMISSION

ETCHING

121

122

EXPOSURE

RESIST REMOVAL

UV LIGHT EMISSION

ETCHING

123

EXPOSURE

RESIST REMOVAL

UV LIGHT EMISSION

DIELECTRIC FILM

FIG. 27A
RESIST PATTERNING
FIG. 27B
HF-ET
FIG. 27C
FIG. 27D
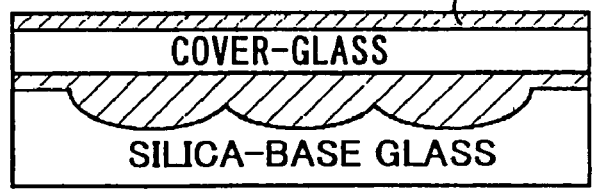

METHOD OF PRODUCING IMAGE DISPLAY DEVICE AND IMAGE PROJECTOR APPARATUS

The subject matter of application Ser. No. 10/471,382 is incorporated herein by reference. The present application is a continuation of U.S. application Ser. No. 10/471,382, filed Sep. 9, 2003, which claims priority to Japanese Patent Application No. JP2002-13612, filed Jan. 23, 2002, and WIPO Patent Application No. PCT/JP03/00483, filed Jan. 21, 2003. The present application claims priority to these previously filed applications.

TECHNICAL FIELD

The present invention relates to an image display device and an image projector apparatus utilizing the same. More particularly, the present invention relates to technology for an image display device provided with a periodic structure of a plurality of pixels arranged in a matrix and substrates supporting the plurality of pixels, modulating light entering from an entrance surface in pixel units, and emitting the result from an exit surface, which prevents occurrence of high-order diffracted light caused by the periodic structure of fine pixels and increases the amount of non-diffracted light inherently required.

BACKGROUND ART

In past LCD projectors and other image display apparatuses, the size of a pixel (pixel pitch) in the LCD panel or other image display device was usually 10 odd μm or more. In recent years, however, progress has been made in reducing the size and increasing the definition of LCD panels and ones with pixel pitches of 10 μm or less have started to appear in the market.

Along with increasing fineness of pixel pitch, the following problems have been encountered.

The first problem is that a beam of light striking the LCD panel is diffracted by the pixel periodic structure and generates unnecessary high-order diffracted light, particularly "1st order diffracted light with a non-negligible reduction of diffraction efficiency. This not only becomes a cause of stray light (flare) in an LCD projector, but also reduces the luminance, since an amount of 0th order light (non-diffracted light) inherently required is decreased and leads to a reduction in the luminance.

The second problem is the drop in the area ratio of the region through which light can pass to the area of a pixel as a whole, that is, the drop in the aperture ratio. A pixel is formed not only by the pixel electrode forming the aperture, but also a thin film transistor or other switching device and a holding capacitor. As the pixel pitch becomes finer, the area occupied by the switching device and holding capacitor increases relatively. The area of the aperture is sacrificed (becomes smaller) by that amount and a decline in the aperture ratio is caused.

The first problem will be explained. Even in a conventional 10 odd μm pitch LCD panel, in theory, diffracted light occurred due to the pixel periodic structure. Expressing the diffraction phenomenon by an equation, $\sin(\theta)=(\lambda/p)$ is obtained. Here, $\lambda$ represents the wavelength, p the pixel pitch, and $\theta$ the diffraction angle. In the past, the pixel pitch was large, so the diffraction angle $\theta$ given by the above equation was small and the 0th order light and high-order diffracted light ("1st order, "2nd order light) were not separated much at all, so the above problem did not conspicuously appear. However, due to the increasing fineness of pixel pitch in recent years, the diffraction angle $\theta$ given by the above equation has become large and the above problem can no longer be ignored. This problem is, for example, explained in David Armitage, "Resolution issues in reflective microdisplays", *SPIE, vol.* 3634, 10 (1999).

Next, the second problem will be explained. In this type of image display device, in particular a projection type image display device, the circuit pattern of the switching device and holding capacitor for modulating a light beam passing through each pixel is located adjacent to the pixel electrode. Along with the increasing fineness of pixel pitch, however, the ratio of area occupied by the circuit pattern increases. As a result, the problem arises that the aperture ratio falls and the efficiency of utilization of light falls. As a means for solving this problem, the method of providing a micro-lens array comprised of a large number of micro-lenses arranged at the incidence sides of the pixels and using the micro-lens array to focus the light beams striking the pixels is disclosed in for example Japanese Unexamined Patent Publication (Kokai) No. 3-236987. However, the micro-lenses are arranged corresponding to the pixels. Therefore, the micro-lens array itself has a periodic structure similar to the pixel array and diffracted light again arose. This has become a problem even more non-negligible when superposed with the diffraction due to the pixel periodic structure.

DISCLOSURE OF THE INVENTION

To solve the above problems in the prior art, the present inventor devised the following means.

That is, a first aspect of the present invention is an image display device having a periodic structure of pixels arranged in a matrix and substrates supporting said plurality of pixels, modulating light entering it from an entrance surface, and emitting the result from an exit surface, characterized in that a phase shift structure for randomly changing the phase of the light is formed on a surface of a substrate through which light passes.

In an embodiment of the present invention, said phase shift structure includes a relief structure formed by etching the surface of a substrate through which light passes to random depths.

In another embodiment of the present invention, said phase shift structure includes a relief structure formed by forming a dielectric transparent film on the surface of a substrate through which light passes to random thicknesses.

Preferably, said phase shift structure is formed using photolithography.

Further, said phase shift structure has a relief structure with thicknesses differing in pixel units.

The present invention further includes an image projector apparatus using said image display device as a light bulb.

A second aspect of the present invention is an image display device provided with a periodic structure of pixels arranged in a matrix and substrates supporting said plurality of pixels, modulating light entering it from an entrance surface, and emitting the result from an exit surface, characterized in that a phase shift structure for randomly changing the phase of the light and a micro-lens structure for converging entering light toward the pixels are formed on the surface of said substrate through which the light passes.

In an embodiment of the present invention, said phase shift structure includes a relief structure formed by etching the surface of a substrate through which light passes to random depths.

In another embodiment of the present invention, said phase shift structure includes a relief structure formed by forming a dielectric transparent film on the surface of a substrate through which light passes to random thicknesses.

Preferably, said phase shift structure is formed using photolithography. Further, said phase shift structure has a relief structure with thicknesses differing in pixel units.

Preferably, said micro-lens structure has apertures of the same size as individual pixels and arrayed by the same period as the periodic structure of the pixels. Further, said micro-lens structure converges entering light to focus it at the pixels.

The present invention further includes an image projector apparatus using said image display device as a light bulb.

According to the first aspect of the present invention, by forming a phase shift structure giving a random phase difference to incident light at entrance surfaces or exit surfaces of pixels of an image display device, occurrence of high-order diffracted light caused by the fine pixel periodic structure of is prevented, the amount of 0th order light (non-diffracted light inherently required) is increased, and the luminance of the display image is raised.

According to the second aspect of the present invention, by forming a phase shift structure giving a random phase difference to incident light at entrance surfaces or exit surfaces of pixels of an image display device, occurrence of high-order diffracted light caused by the fine pixel periodic structure is prevented and the amount of 0th order light (non-diffracted light inherently required) is increased, while by forming a micro-lens structure at the entrance surfaces of the pixels, blockage of incident light by circuit patterns for driving pixel switching is prevented and the luminance of the display image is increased. At that time, by forming a phase shift structure giving a random phase difference to incident light, occurrence of high-order diffracted light caused by the fine pixel periodic structure can be also prevented.

BRIEF DESCRIPTION OF THE DRAWINGS

FIGS. 2A and 2B are partially enlarged views of the configuration of a general projection-type LCD panel.

FIGS. 3A to 3C are views showing an example in which a phase shift structure is formed on the surface of a counter substrate illustrated in FIG. 2A and FIG. 2B at the light entrance side (glass dust shield side).

FIGS. 9A to 9C are views showing an example of forming a phase shift structure on a counter substrate in the LCD panel illustrated in FIGS. 8A and 8B.

FIGS. 27A to 27D are process charts showing still another embodiment of a method of forming a micro-lens structure used in an LCD panel according to the present invention.

BEST MODE FOR CARRYING OUT THE INVENTION

Below, embodiments of the present invention will be described in detail with reference to the drawings.

Projection-type LCD Panel

Figure 1:
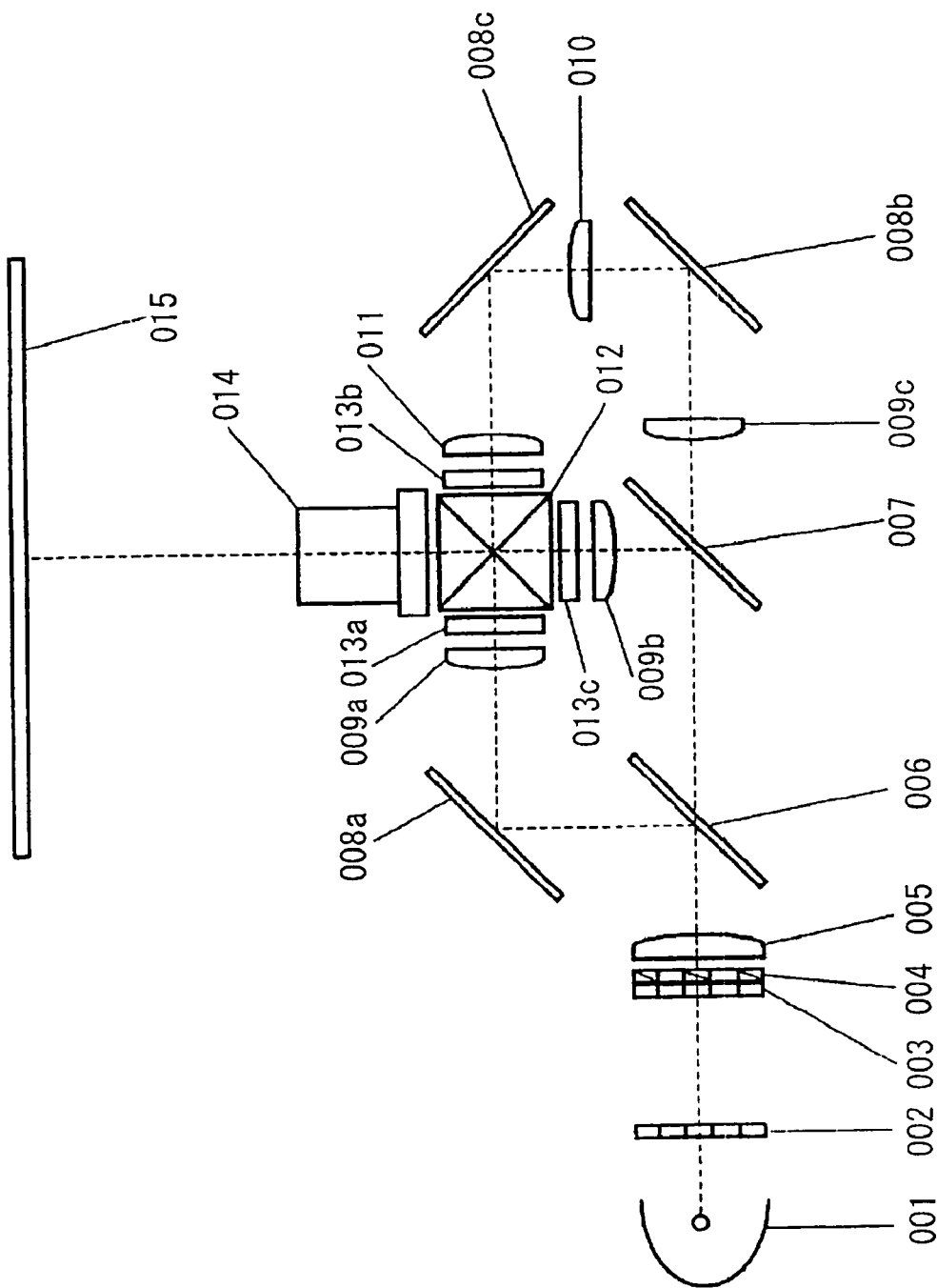
FIG. 1 is a schematic view of an optical system of a general LCD projector using a projection-type LCD panel.

FIG. 1 is a schematic view of an optical system of a general LCD projector using a projection-type LCD panel.

The optical system of the LCD projector illustrated in FIG. 1 comprises a light source lamp 001, a first fly eye lens 002, a second fly eye lens 002, a PS separation mixing element 004 for separating and mixing a P-wave and S-wave, a condenser lens 005, RGB color separation filters 006 and 007, mirrors 008a to 008c, field lenses 009a to 009c, relay lenses 010 and 011, a dichroic prism 012, projection-type LCD panels 013a to 013c, and a projection lens 014 and projects an enlarged image onto a screen 015.

Note that in order for the RGB color separation filters 006 and 007 to extract the R (Red), G (Green), and B (Blue) components, for example, the filter 006 reflects the B component toward the mirror 008a and passes the G and R components to the filter 007, while the filter 007 reflects the G component toward the lens 009b and passes the R component to the lens 009c.

The projection-type LCD panel illustrated in FIG. 1 modulates the B, G, and R components in accordance with an image signal input to the projection-type LCD panels 013a to 013c and projects the modulated enlarged image on the screen 015.

The present invention improves LCD panels such as the projection-type LCD panels 013a to 013c.

FIGS. 2A and 2B are partially enlarged views of the configuration of a general projection-type LCD panel, in which FIG. 2A shows the state with an exterior frame attached and FIG. 2B shows the state with the exterior frame removed. A general projection-type LCD panel is comprised of a TFT substrate 101, counter substrate 102, exit side glass dust shield side 103, entrance side glass dust shield 104, exterior frame 105, and flexible connector 106. Liquid crystal is sealed between the TFT substrate 101 and the counter substrate 102. The effective pixel area is the area indicated by reference numeral 107. In the case of an ordinary projector LCD panel, light enters from the counter substrate 102 side as input light Li and exit from the TFT substrate 101 side as output light Lo.

FIGS. 3A to 3B show an example in which a phase shift structure 109 is formed on the surface of the counter substrate 102 illustrated in FIG. 2A and FIG. 2B of the entrance side of the light (glass dust shield 104 side). FIG. 3B illustrates enlarged the part in the effective pixel area 107 in FIG. 3A, while FIG. 3C illustrates enlarged a cross-section A–A=in FIG. 3B. The entrance surface of the counter substrate 102 is etched or formed with a film to any depth or thickness from d=0 to d=λ/|N1−N2| using as unit structures the same pitch as the pixels 108 of the plurality of pixels arranged two-dimensionally. Note that d indicates the depth, λ a central wavelength, N1 the substrate refractive index at the central wavelength, and N2 the refractive index of the phase shift structure at the central wavelength. For example, when the reference wavelength λ=550 nm, N1=1.5, and N2=1.0 (air), d is any value between 0 to 1100 nm. At this time, light passing through the pixels is given any phase difference between $$2\pi/\lambda \times d \times |N1-N2|=0 \text{ to } 2\pi$$

using an area of zero etching depth or film formation thickness as a reference. Further, when a phase shift structure with the refractive index N2 is not that of air but a transparent resin or the like filled in, if for example N2=1.4, d will be any value between 0 to 5500 nm. The reason for matching the pixel pitch and pitch of the phase shift structure is to prevent the boundaries of the phase shift structure (lines where etching depth or film formation thickness changes) from entering into the pixels and thus influencing image quality.

Figure 4:
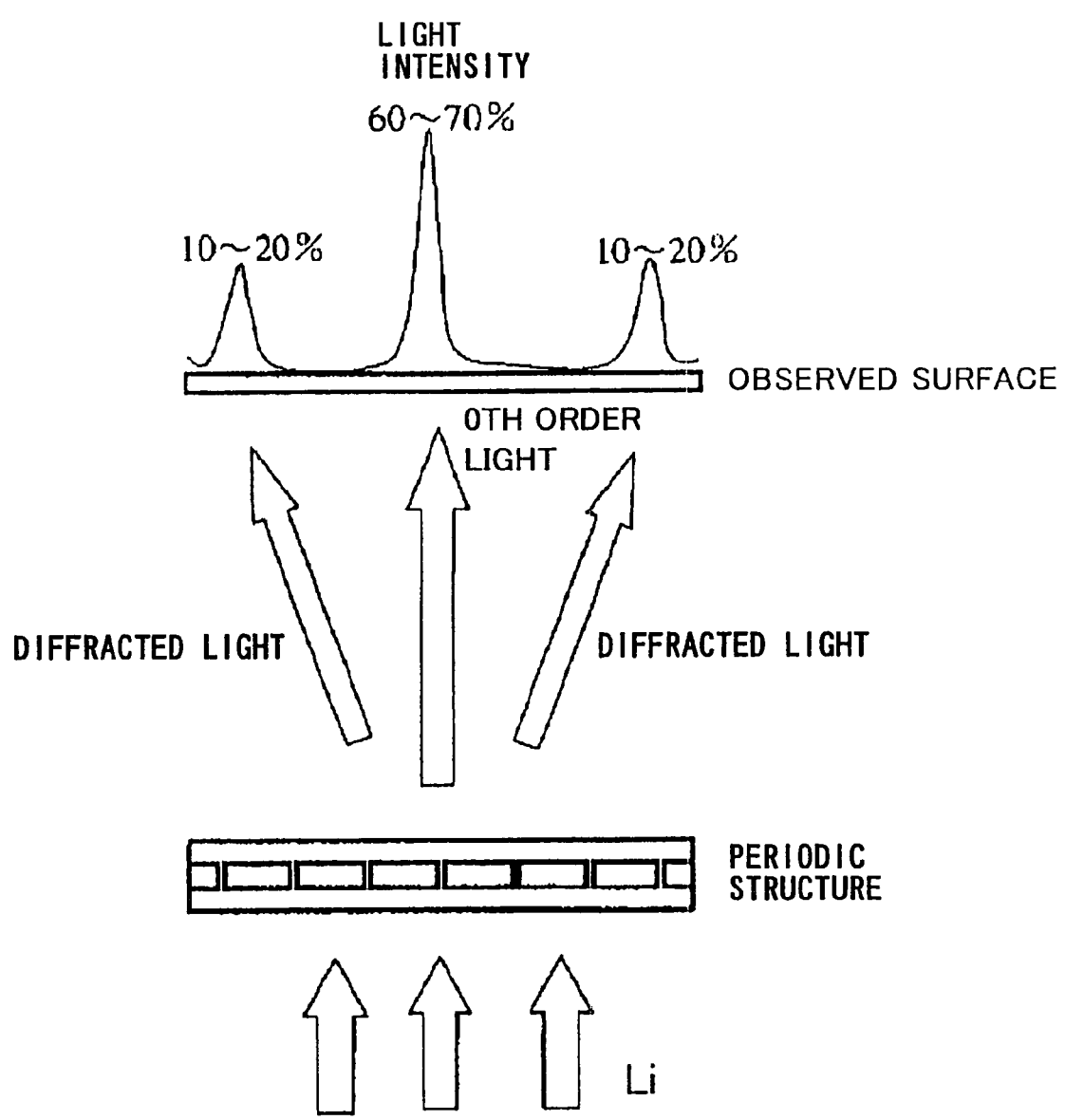
FIG. 4 is a view explaining a diffraction phenomenon due to a general periodic structure.

In general, as illustrated in FIG. 4, when light passes through a periodic structure area and reaches an observed surface in question, a diffraction (interference) pattern will be formed by the light waves being strengthened by each other at places where the difference in optical path length from the individual periodic units to the observed surface is an even multiple of a half wavelength and the light waves being weakened by each other at places where the difference in optical path length is an odd multiple of the half wavelength. At this time, the diffraction efficiency (ratio of amount of light to incident light) of the 0th order light (non-diffracted light) decreases about 60 to 70%, while conversely first-order diffracted light having a diffraction efficiency of 10 to 20% or so or high-order diffracted light having a diffraction efficiency of several % or so will end up occurring. However, this is predicated on the phases of light entering the periodic structure being aligned with each other.

Figure 5:
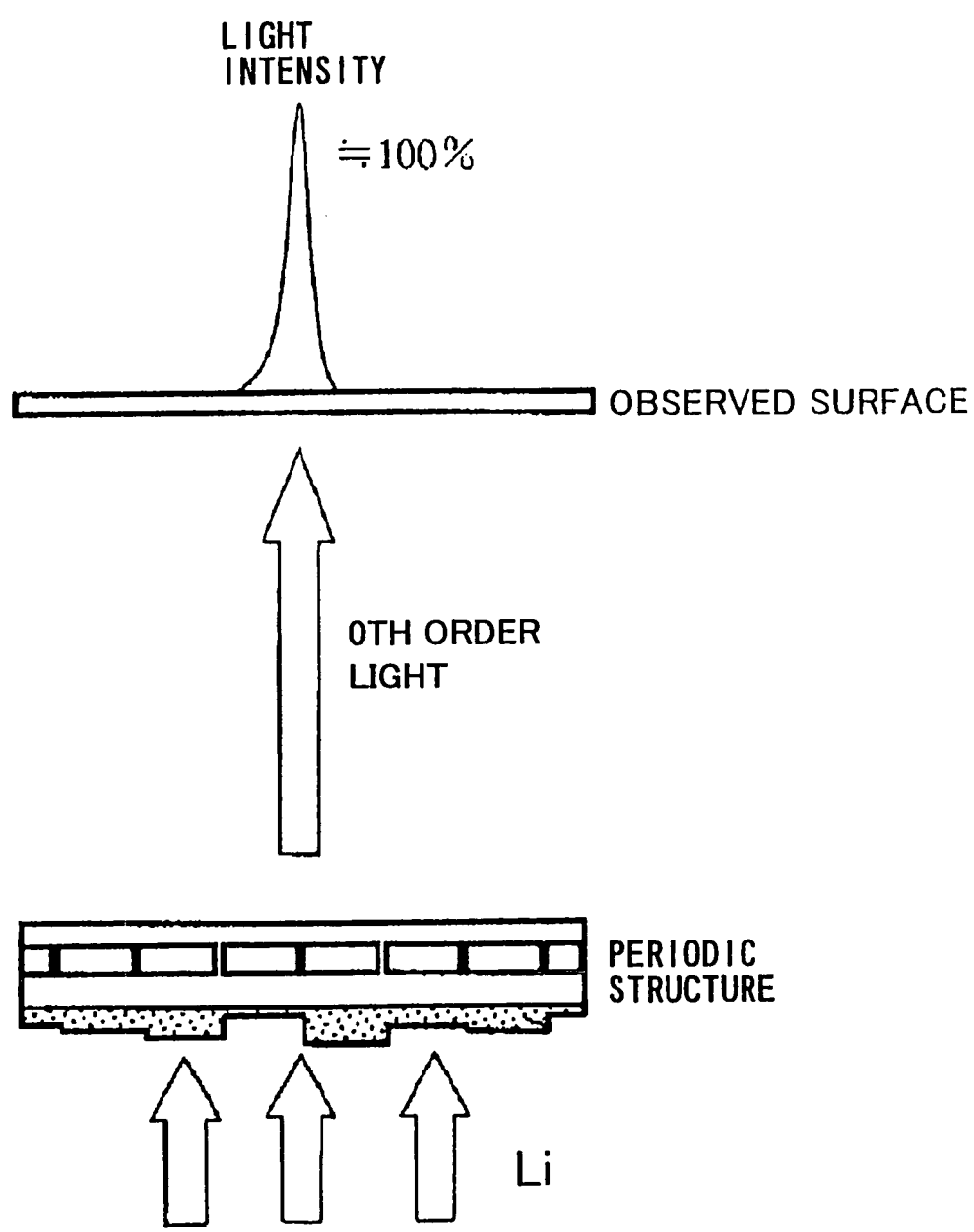
FIG. 5 is a view explaining a case of adding a phase shift structure to a periodic structure as a first embodiment of the present invention.

However, as illustrated in FIG. 5, by forming a random phase shift structure at the entrance surface (or exit surface) of the periodic structure, the phases of the light immediately after exiting become no longer aligned and as a result it is possible to suppress occurrence of a diffraction pattern (high-order diffracted light). Therefore, by forming the phase shift structure according to the present invention on the entrance surface of the counter substrate 102, it becomes possible to suppress the occurrence of high-order diffracted light.

Figure 6:
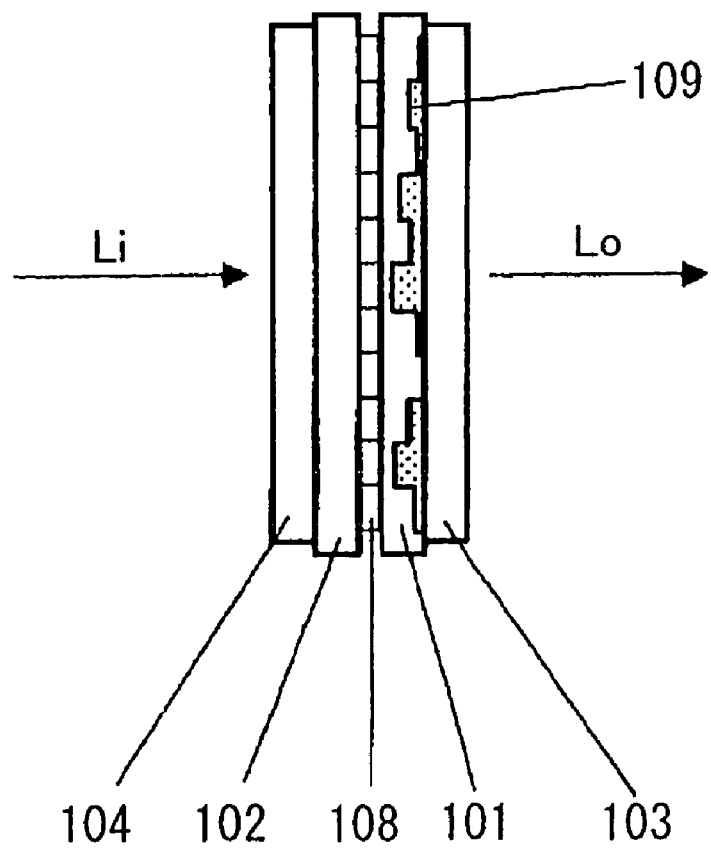
FIG. 6 is a view showing an example of forming a phase shift structure on a TFT substrate as a second embodiment of the present invention.
Figure 7:
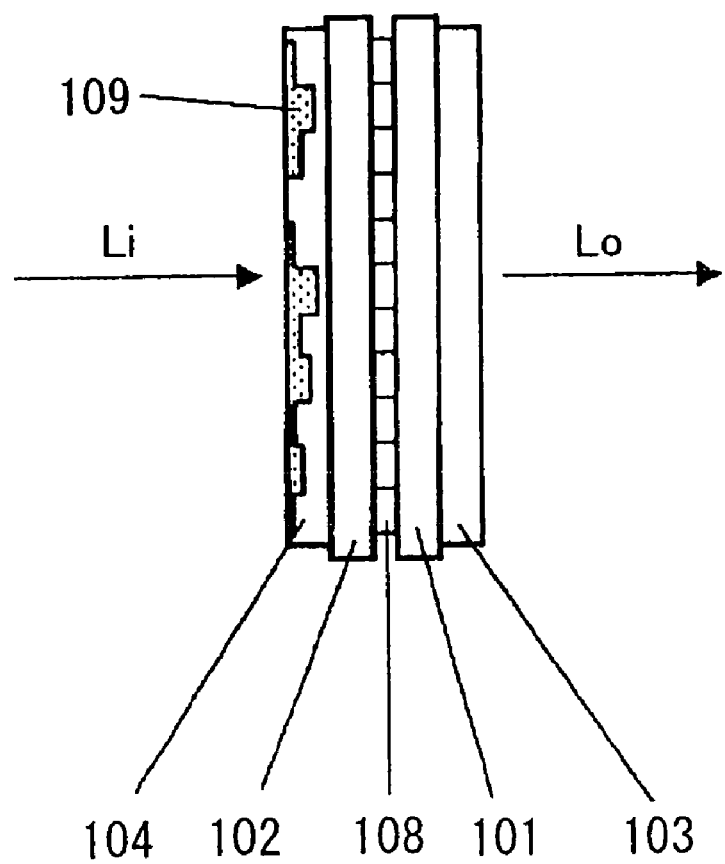
FIG. 7 is a view showing an example of forming a phase shift structure on a glass dust shield as a third embodiment of the present invention.

In the first embodiment of the present invention, the phase shift structure is formed at the entrance surface of the counter substrate 102, but a similar effect can be obtained even if forming the phase shift structure at the exit surface of the TFT substrate 101 as illustrated in FIG. 6 or at the entrance surface (or exit surface) of the glass dust shield 104.

In an ordinary projector LCD panel, the light enters the counter substrate side and exits from the TFT substrate side, but even if configured so that the light enters the TFT substrate side and exits from the counter substrate side, a similar effect would be obtained by forming the phase shift structure according to the present invention at either an entrance surface or an exit surface of the a substrate.

In the present embodiment, the example is shown of forming the phase shift structure on the exit surface of a projection-type LCD panel, but the invention may also be applied to another projection-type (or transmission-type) image display device as well.

As explained above, the image display device according to the present invention, as its basic configuration, is provided with a periodic structure of pixels 108 arranged in a matrix and substrates 101, 102 supporting the pixels, modulates light entering an entrance surface in pixel units, and emits the result from an exit surface. The present invention is characterized by forming a phase shift structure 109 for random changing the phase of the light on, for example, the surface of the substrate 101 through which the light passes. The phase shift structure 109 is comprised of a relief structure formed by etching the surface of the substrate 101 through which the light passes to a random depth. Alternatively, the phase shift structure may be a relief structure formed by forming a dielectric transparent film on the surface of a substrate through which the light passes to random thicknesses. The phase shift structure 109 is formed by, for example, photolithography. Preferably, the phase shift structure 109 has a relief structure differing in thickness in pixel units.

Figure 8A:
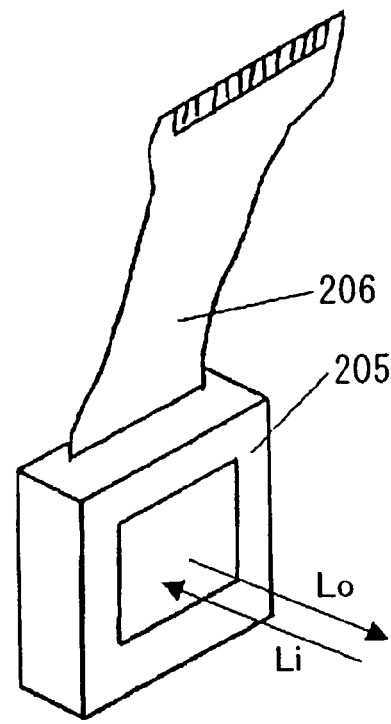
FIGS. 8A and 8B are views of the configuration of a general reflection-type LCD panel.
Figure 8B:
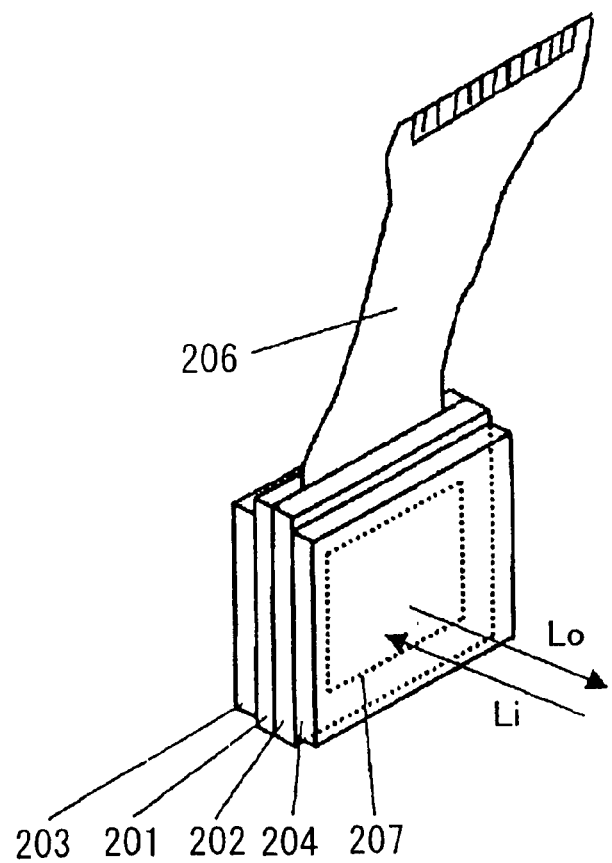

FIGS. 8A and 8B are views of the configuration of a general reflection-type LCD panel. FIG. 8A shows the state with the exterior frame attached, while FIG. 8B shows the state with the exterior frame detached. The general reflection-type LCD panel is comprised of a TFT substrate 201, a counter substrate 202, a reflection plate 203, a glass dust shield 204, an exterior frame 205, and a flexible cable 206. Alternatively, there is also a case where the counter substrate 202 is formed on the reflection plate 203 side, and the TFT substrate 201 is formed on the glass dust shield 204 side. The effective pixel area is the area indicated by reference numeral 207.

FIGS. 9A to 9C are views showing an example of forming a phase shift structure on the surface of the counter substrate 202 where the light enters (glass dust shield 204 side) in the LCD panel illustrated in FIGS. 8A and 8B. FIG. 9B is a view illustrating enlarged the part of the effective pixel area 207 in FIG. 9A, while FIG. 9C is a view illustrating enlarged the A–A= cross-section in FIG. 9B. The surfaces of the pixel areas of the TFT substrate 201 (glass dust shield 204 side) are etched or formed with film to any depth or thickness between d=0 to d=$\lambda$/|N1−N2| in unit structures of the same pitch as the pixels 208. d is the depth, $\lambda$ the central wavelength, N1 the substrate refractive index at the central wavelength, and N2 the refractive index of the phase shift structure at the central wavelength. For example, when the reference wavelength $\lambda$=550 nm, N1=1.5, and N2=1.0 (air), d will be any value between 0 to 550 nm. When the phase shift structure is filled with a transparent resin or the like, for example N2=1.4 and d is any value between 0 to 2750 nm. At this time, the light passing through the pixels is given any phase difference between $$2 \times 2\pi/\lambda \times d \times |N1-N2|=0 \text{ to } 2\pi$$

using as a reference an area where the etching depth or film formation thickness is zero.

Due to this, in the same way as the above-mentioned embodiment, occurrence of high-order diffracted light caused by the periodic structure of very fine pixels can be suppressed.

Figure 10:
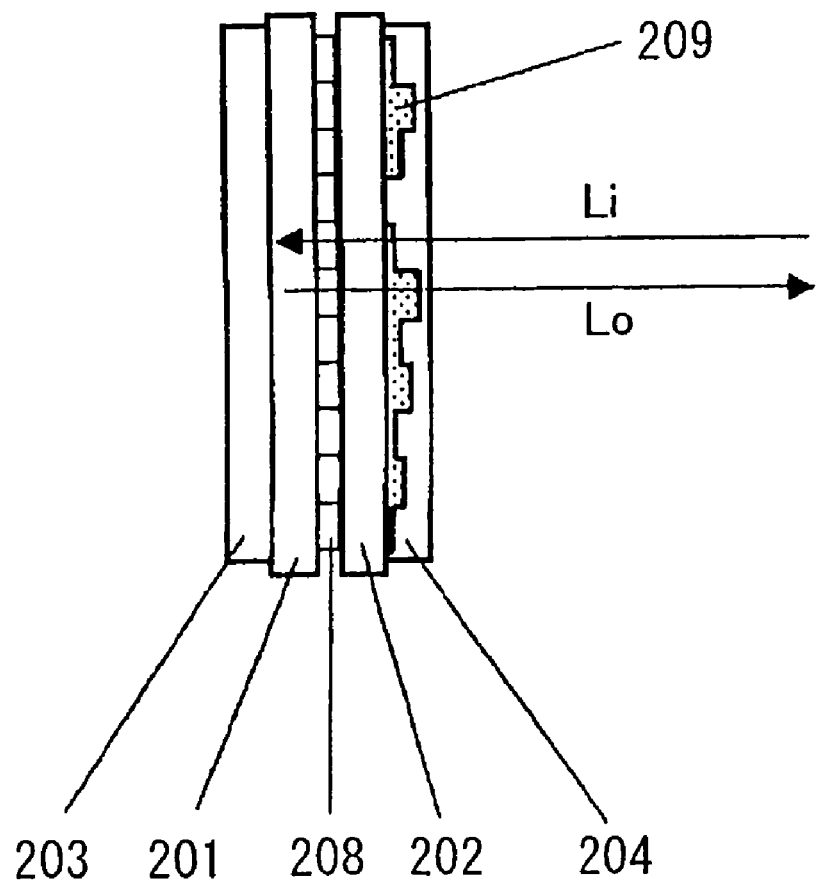
FIG. 10 is a view showing an example of forming a phase shift structure on a glass dust shield in the LCD panel illustrated in FIGS. 8A and 8B.

In this embodiment of the present invention, the phase shift structure was formed on the surface of the counter substrate 202, but a similar effect is obtained even if forming the phase shift structure on the glass dust shield 204 as illustrated in FIG. 10 or the surface of the TFT substrate 202. Further, similarly, even if the case of a reflection-type LCD panel where the counter substrate 202 is formed on the reflection plate 204 side and the TFT substrate 201 is formed on the glass dust shield 203 side, the same effect is obtained if forming the phase shift structure on either the TFT substrate side or the counter substrate side. In the present embodiment according to the present invention, the example is shown of application of the phase shift structure to a reflection-type LCD panel, but the invention can also be applied to another reflection-type image display apparatus. For example, it may also be applied to an LCOS (Liquid Crystal On Silicon), DLP (Digital Light Processor), DMD (Digital Mirror Device), or the like.

Method of Forming Phase Shift Structure by Etching

As a method of forming the phase shift structure 109 or 209, the method of etching using photolithography, the method of film formation, etc. Below, an example of the method of forming the phase shift structure by etching will be shown. The method of forming the phase shift structure is the same as the method of fabrication of a general diffraction-type optical device using photolithography.

(1) Exposure and Development

Figure 11B:
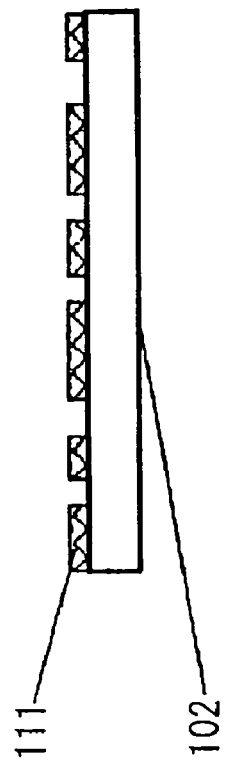
FIGS. 11A to 11D are views explaining a method of forming a phase shift structure by photolithography as a first embodiment of the present invention.
Figure 11D:
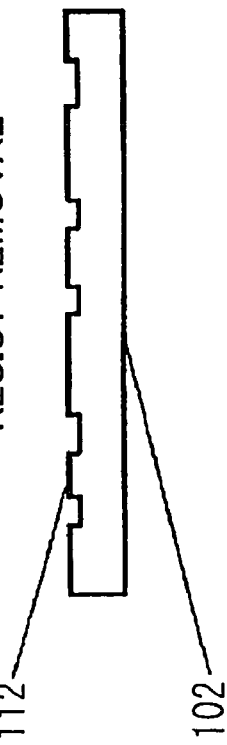
Figure 11A:
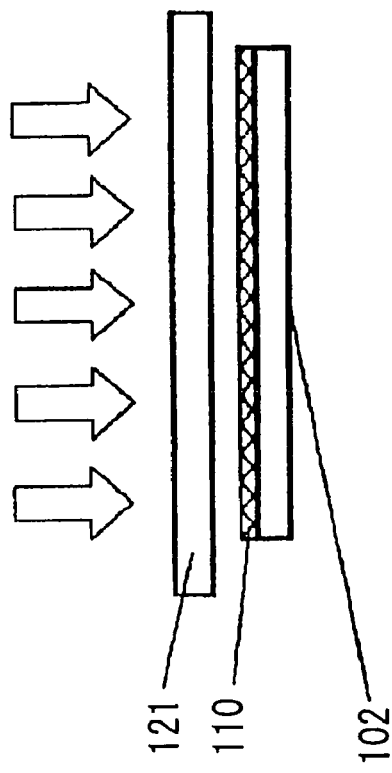

First, as illustrated in FIG. 11A, a photoresist 110 coated on a counter substrate 102 in advance is exposed using a first EB mask 121 and a UV emitter and is developed as illustrated in FIG. 11B.

Figure 12:
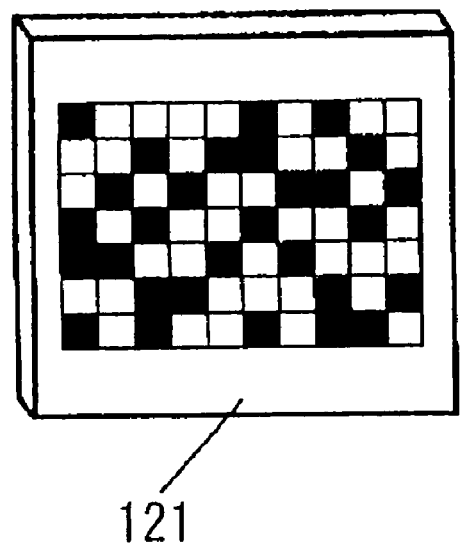
FIG. 12 is a view explaining a first EB mask in FIGS. 11A to 11D.

As shown in FIG. 12, the first EB mask 121 has Cr (white part) areas and non-Cr (black part) areas as unit areas of the same dimensions as individual pixels arranged randomly on it. When developing the counter substrate 102 exposed using this, a photoresist pattern 111 of a random array is transferred.

(2) Etching and Resist Removal

Figure 11C:
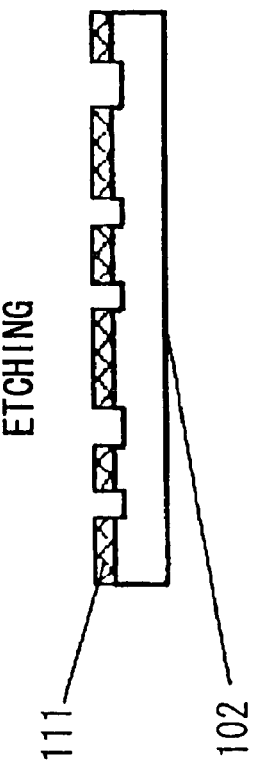

In this state, as illustrated in FIG. 11C, the substrate is etched to a depth of $\lambda$/2/(N−1)=550 nm (half of that, 275 nm, in the case of a reflection-type) and, as illustrated in FIG. 11D, the photoresist pattern 111 is removed, a random pattern structure 112 of etched areas and non-etched areas is formed on the surface of the counter substrate 102.

Figure 13A:
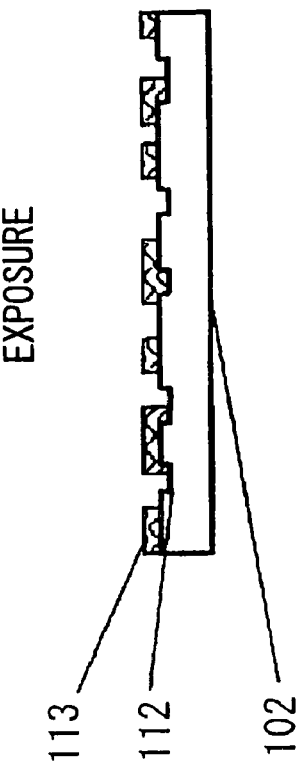
FIGS. 13A to 13D are views explaining a method of forming a phase shift structure by photolithography as a second embodiment of the present invention.
Figure 13B:
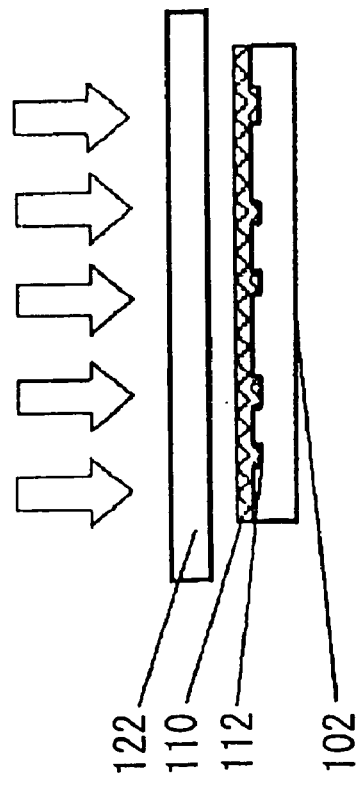
Figure 13C:
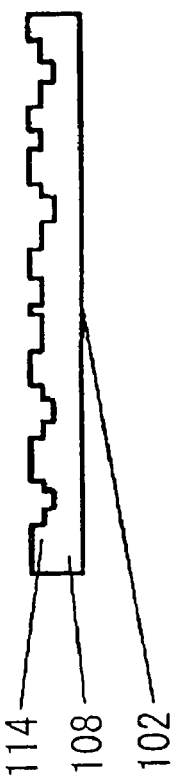
Figure 13D:
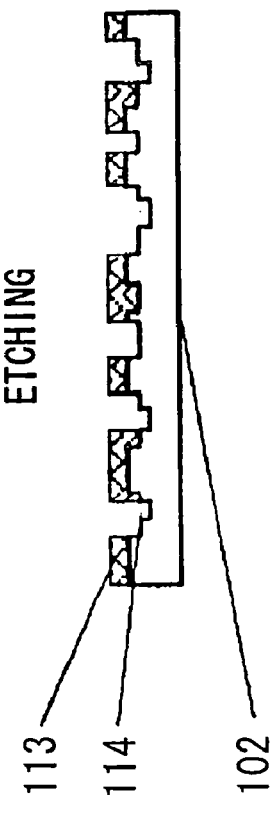
Figure 14:
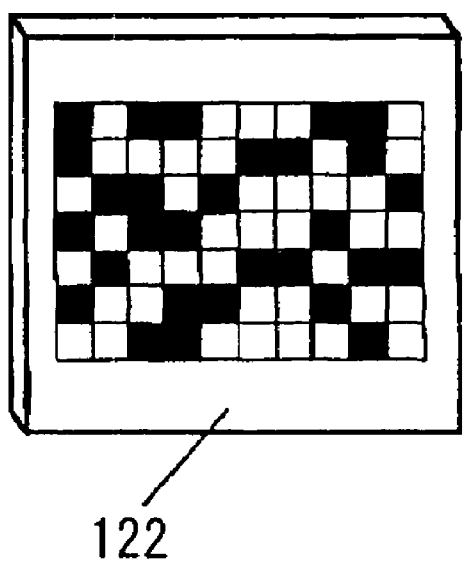
FIG. 14 is a view explaining a second EB mask in FIGS. 13A to 13D.
Figure 15B:
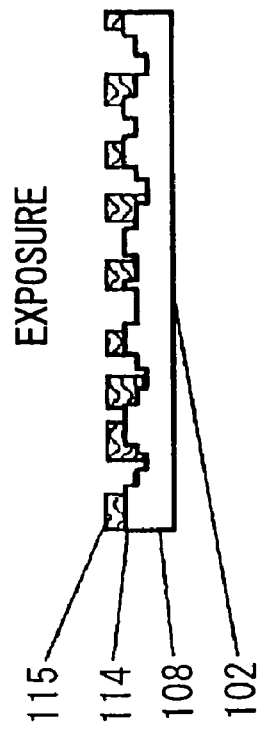
FIGS. 15A to 15D are views explaining a method of forming a phase shift structure by photolithography as a third embodiment of the present invention.
Figure 15D:
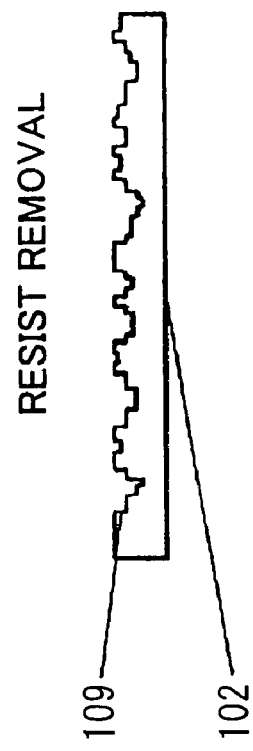
Figure 15A:
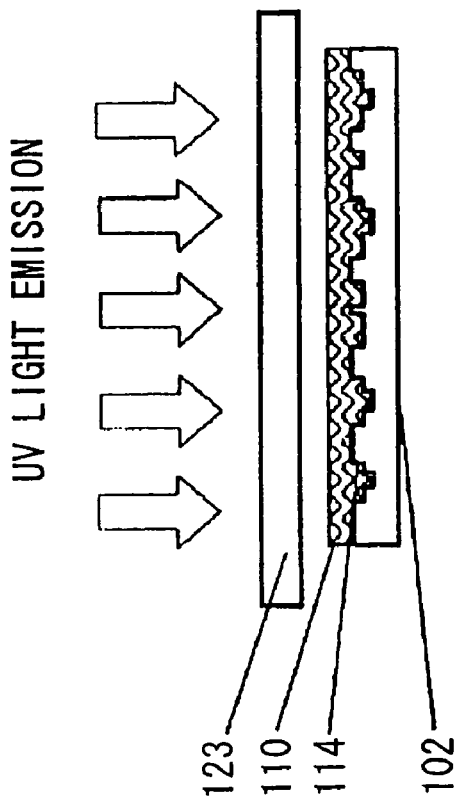
Figure 15C:
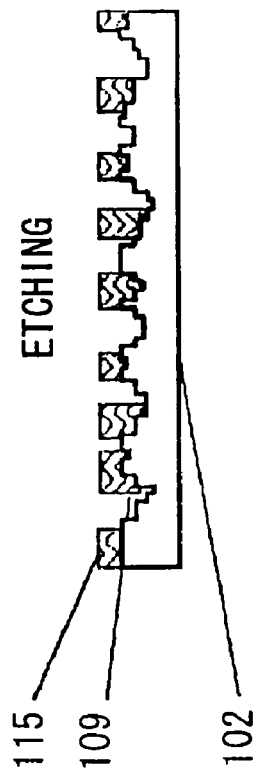

Next, as illustrated in FIG. 13A, a photoresist 110 is again coated on the counter substrate 102 having the pattern structure 112, then the substrate is similarly exposed using the second EB mask 122 by the UV emitter, is developed as illustrated in FIG. 13B, is etched to a depth of $\lambda$/4/(N−1)=275 nm (half of that, or 138 nm, in case of a reflection-type) as illustrated in FIG. 13C, and is stripped of the photoresist pattern 113 as illustrated in FIG. 13D. As illustrated in FIG. 14, the second EB mask 122, in the same way as the first EB mask 121, has Cr and non-Cr areas of units of individual pixels arranged randomly. However, the pattern of arrangement is different from the EB mask 121. Through this process, a structure 114 having four types of randomly arranged etching depths is formed on the surface of the counter substrate 102.

Figure 16:
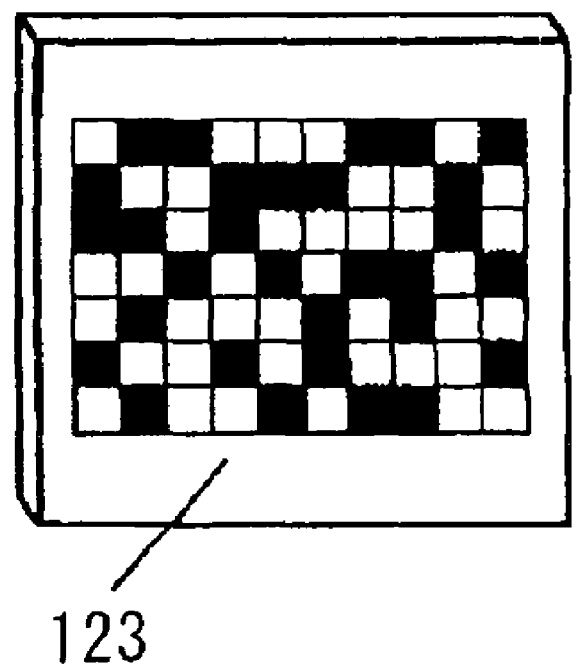
FIG. 16 is a view explaining a third EB mask in FIGS. 15A to 15D.

Further, as illustrated in FIGS. 15A to 15D, by using a third EB mask 123, UV exposure, development, etching, and resist removal are performed in the same way as the method described with reference to FIGS. 11A to 11D and FIGS. 12A to 12D. As illustrated in FIG. 16, the third EB mask 123, in the same way as the first EB mask 121 and the second EB mask 122, has Cr and non-Cr areas of units of individual pixels arranged randomly. However, the pattern of arrangement is different from the first EB mask 121 and the second mask 122. The etching depth in this process is $\lambda$/8/(N−1)=138 nm (half of that, 69 nm, in case of a reflection-type). If removing the photoresist pattern, a phase shift structure 109 (eight level binary shape) having eight types of etching depths of 138 nm, 275 nm, 413 nm, 550 nm, 688 nm, 825 nm, 963 nm, and 1100 nm (69 nm, 138 nm, 207 nm, 275 nm, 344 nm, 413 nm, 482 nm, and 550 nm in case of a reflection-type) arranged randomly is formed on the surface of the counter substrate 102.

Figure 17:
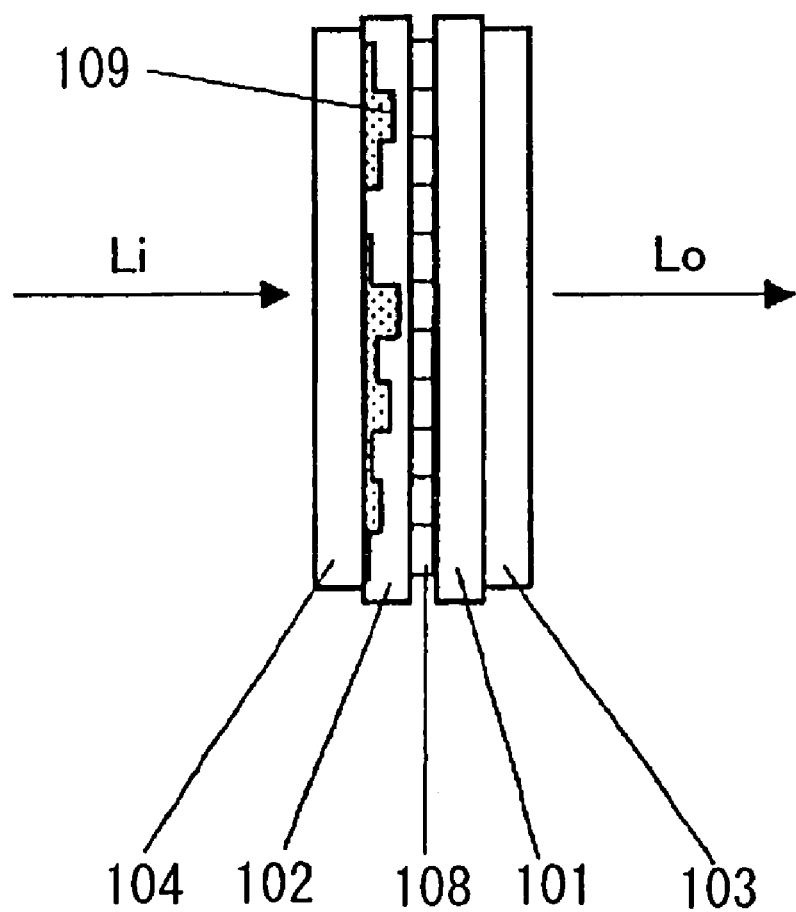
FIG. 17 is a view explaining an example of forming a phase shift structure on a counter substrate in the LCD panel illustrated in FIGS. 8A to 8B.

After the above process, if bonding a TFT substrate 101 and glass dust shields 103 and 104 to the counter substrate 102 formed with the phase shift structure 109 illustrated in FIG. 17, an image display device with a random phase shift structure is obtained.

Figure 18B:
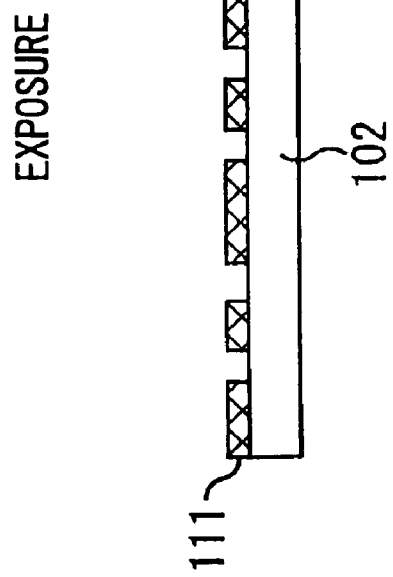
FIGS. 18A to 18D are views explaining a method of forming a phase shift structure by photolithography as a fourth embodiment of the present invention.
Figure 18D:
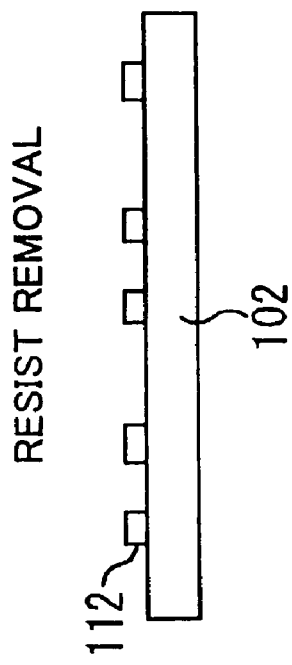
Figure 18A:
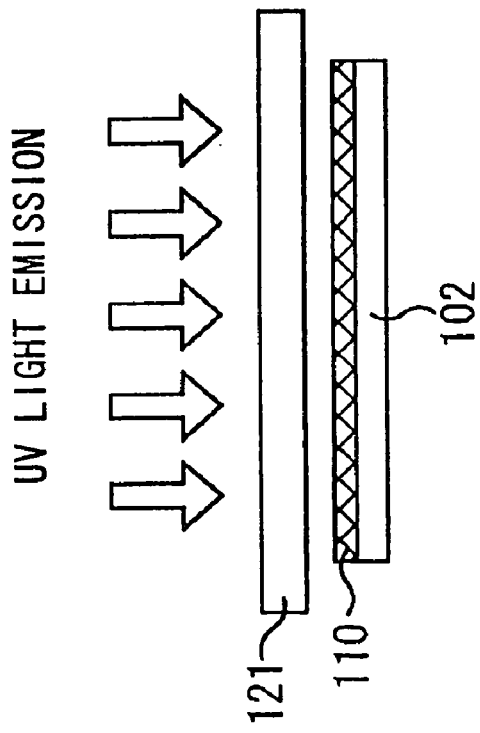
Figure 18C:
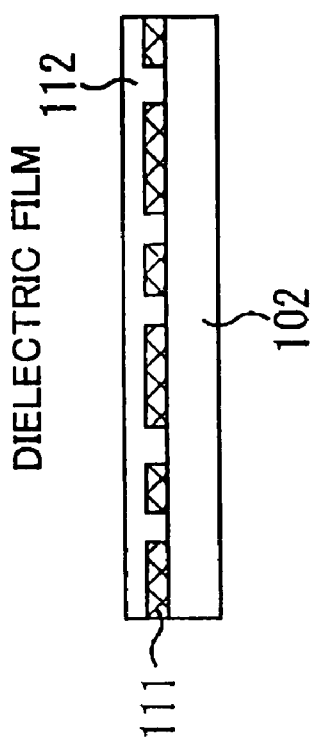

The phase shift structure can also be formed, instead of by etching the substrate, by forming a dielectric transparent film. This example is illustrated in FIGS. 18A to 18D. The process illustrated in FIGS. 18A to 18D is similar to the process explained referring to FIGS. 15A to 15D, however, instead of the etching step illustrated in FIG. 15C, the film formation step illustrated in FIG. 18C is performed to the same thickness as the etching depth.

In the above concrete example, an eight level binary type was shown, but if repeating the same step n times using n number of different EB masks, then a $2^n$ level binary shape can be formed and better improvement of the phase shift effect can be expected.

Further, when using a gray-level mask having a random UV light transmittance for every pixel unit area, an infinite level random phase shift structure can be formed by one step and a further improvement of the phase shift effect can be expected. Moreover, the structure can be formed by an X-ray lithography LIGA process etc.

Transmission-type Liquid Crystal Panel

Figure 19:
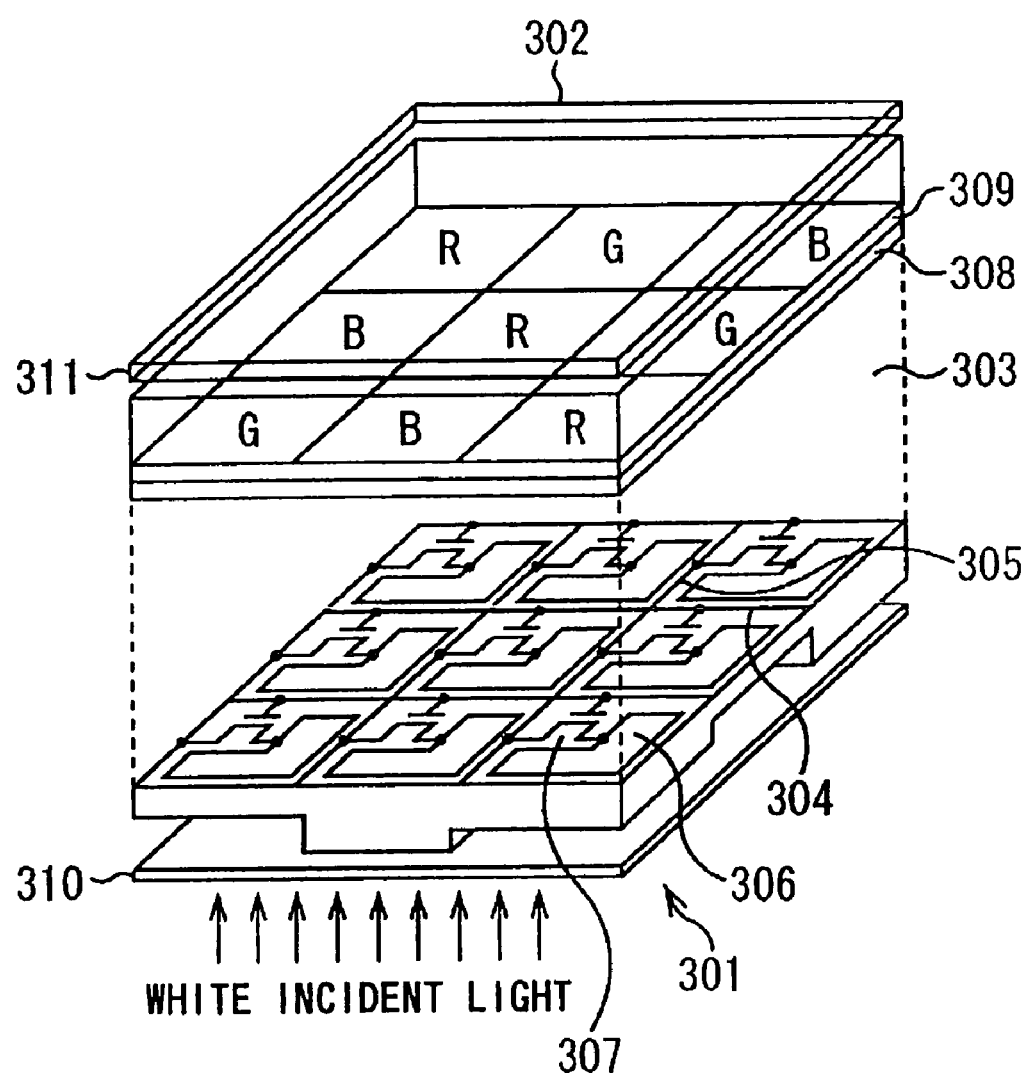
FIG. 19 is a schematic view showing a transmission-type liquid crystal panel as a concrete example of the configuration of an image display device according to the present invention.

FIG. 19 is a schematic view showing a transmission-type liquid crystal panel as a concrete example of the configuration of an image display device according to the present invention.

Such a transmission-type liquid crystal panel is used for an LCD projector.

As shown in FIG. 19, an active-matrix type transmission-type liquid crystal panel holds a liquid crystal 303 between a drive substrate 301 and a counter substrate 302 bonded via a predetermined distance. On the inner surface of the drive substrate 301 are provided scan lines 304 and signal lines 305 perpendicular with each other. At the intersecting points, pixel electrodes 306 and thin-film-transistors (TFT) 307 comprising pixel switches are arranged in a matrix. Further, while not shown, the inner surface of the drive substrate 301 is formed with a rubbed orientation film. Further, the outer surface of the drive substrate 301 is formed with a phase shift structure according to the present invention. On the other hand, the inner surface of the counter substrate 302 is formed with a counter electrode 308 and a color filter layer 309. The color filter layer 309 has RGB segments and is aligned with the individual pixel electrodes 306. Further, while not shown, the surface of the counter electrode 308 is also provided with a similarly rubbed orientation film. Further, polarizing plates 310, 311 are adhered to the outer surfaces of the bonded drive substrate 301 and counter substrate 302.

Thin film transistors 307 are selected via the scan lines 304, and signal charges are written into pixel electrodes 306 via the signal lines 305. Voltage is applied between the pixel electrodes 306 and the counter electrode 308, whereby the liquid crystal becomes active. This is taken out by the pair of cross-nichol arranged polarizing plates 310, 311 as a change of transmission of white incident light for a color display by sensing the liquid crystal. If projecting this display in the front on a screen by an expansion projection optical system, a liquid crystal projector is obtained. Particularly, by installing the active-matrix type transmission-type liquid crystal panel provided with a color filter layer 309, a single-plate type liquid crystal projector is obtained.

Figure 20:
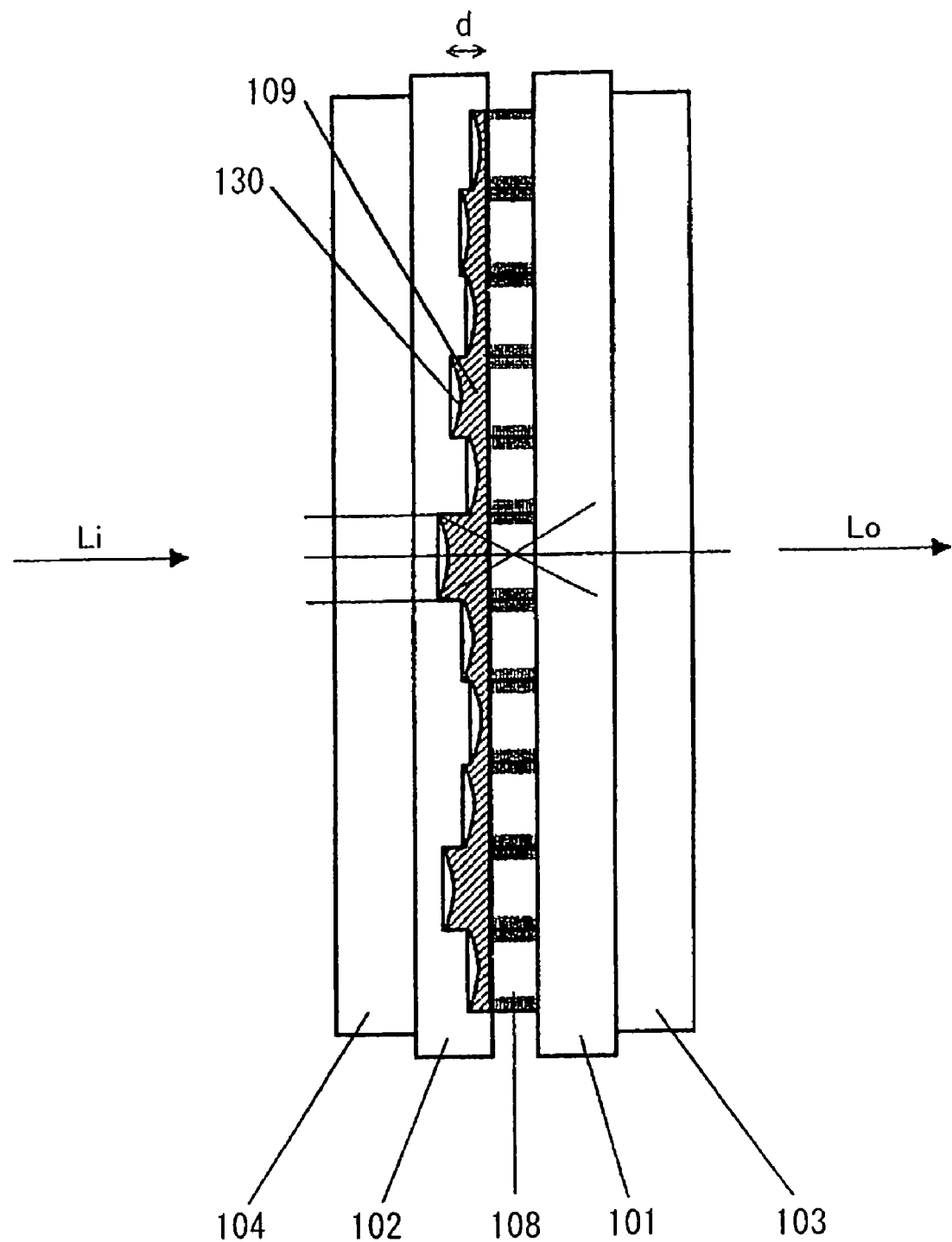
FIG. 20 is a schematic cross-sectional view showing an embodiment of an improved version of the present invention and explaining an example of forming a phase shift structure and a micro-lens structure on a counter substrate.

FIG. 20 is a schematic cross-sectional view showing an embodiment of an improved version of the present invention and showing an example of forming a phase shift structure 109 and a micro-lens structure 130 on a counter substrate 102.

The projection-type LCD panel of the present example is comprised of a TFT substrate 101, counter substrate 102, exit side glass dust shield 103, and entrance side glass dust shield 104. Liquid crystal is sealed between the TFT substrate 101 and counter substrate 102. In the case of an ordinary projector LCD panel, light enters from the counter substrate 102 side and exits from the TFT substrate 101 side.

The LCD panel is formed by pixels 108 arranged in a matrix. The concrete structure of a pixel is as shown in FIG. 19. There is an aperture area where a transparent pixel electrode through which light passes is located and a non-aperture area where a circuit pattern for switching and driving the pixel electrode is located. In the prior art, the non-aperture area where the circuit pattern is formed cannot pass light and thereby led to a drop in the efficiency of utilizing light. The ratio of the area through which light passes to the entire area of a pixel is called the "aperture ratio". In the case of ordinary projector LCD panels, ones with aperture ratios of 50 to 60% or so are the mainstream. Therefore, close to half of the light is blocked by the circuit pattern.

Therefore, in a panel of an improved version of the present invention, as shown in FIG. 20, there is a group of very small lenses provided corresponding to the pixels. These micro-lenses 130 are formed in an array corresponding to the individual pixels on the surface of the counter substrate 102 at the TFT substrate 101 side. Incident light is converged on the corresponding pixels 108 by the micro-lenses 130, so blocking of incident light by pixel switching and driving circuit patterns can be prevented. At this time, the outer diameters of the micro-lenses 130 are equal to the outer diameters of the pixels, and the pitch of the micro-lens array and the pitch of the pixels are equal.

As shown in FIG. 20, the present LCD panel is formed with a phase shift structure 109. That is, the surface of the counter substrate 102 at the TFT substrate 101 side is etched or formed with film to any depth or thickness between $d=0$ to $d=\lambda/|N1-N2|$ in unit structures of the same pitch as the pixels 108. d is the depth, $\lambda$ the central wavelength, N1 the substrate refractive index at the central wavelength, and N2 the refractive index of the phase shift structure at the central wavelength. For example, when the reference wavelength $\lambda=550$ nm, N1=1.5, and N2=1.0 (air), d will be any value between 0 to 1100 nm. At this time, the light passing through the pixels is given any phase difference between ti $2\pi/\lambda \times d \times |N1-N2|=0$ to $2\pi$ using as a reference an area where the etching depth or film formation thickness is zero. Further, when the refractive index N2 is not that of air but a transparent resin or the like filled in, if for example N2=1.4, d will be any value between 0 to 5500 nm. The reason for matching the pixel pitch and pitch of the phase shift structure is to prevent the boundaries of the phase shift structure 109 (lines where etching depth or film formation thickness changes) from entering into the pixels and thus influencing image quality.

Note that the phase shift structure 109 drawn in FIG. 20 is drawn emphasized in depth d, however the actual depth d of the phase shift structure is about 1 μm at the maximum when the medium N2 is air, so the differences of focusing points for the micro-lenses are not of a level posing a problem at all. As described above, by forming a phase shift structure 109 and a micro-lens structure 130 on the surface of the counter substrate 102 at the TFT substrate 101, the occurrence of high-order diffracted light caused by the pixel periodic structure is prevented and simultaneously the blocking of light by circuit patterns for driving pixels is prevented and thereby an increase of the efficiency of utilizing light is contributed to.

Figure 21:
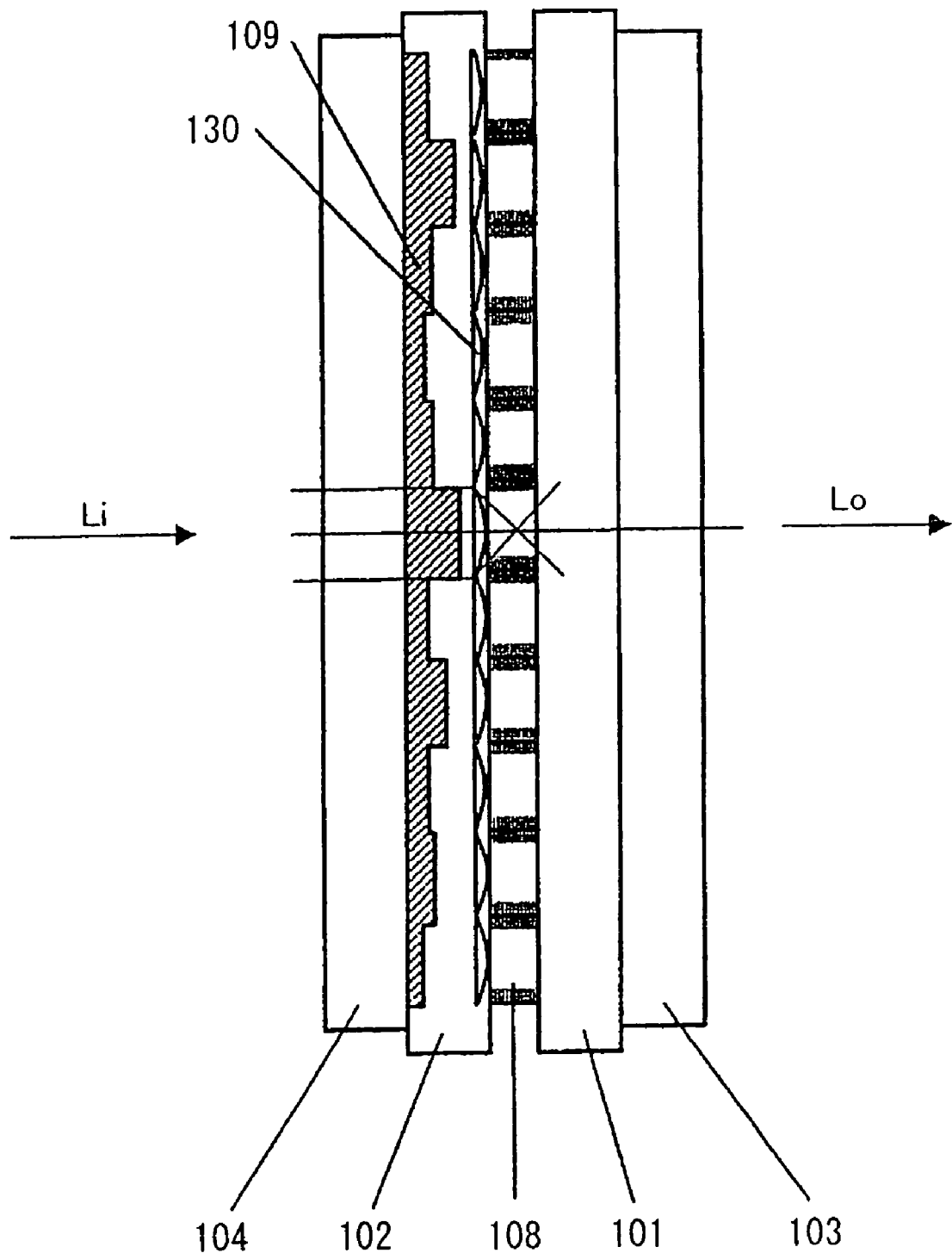
FIG. 21 is a cross-sectional view showing an example of forming a phase shift structure and a micro-lens structure on a counter substrate in the transmission-type liquid crystal panel illustrated in FIG. 19.
Figure 22:
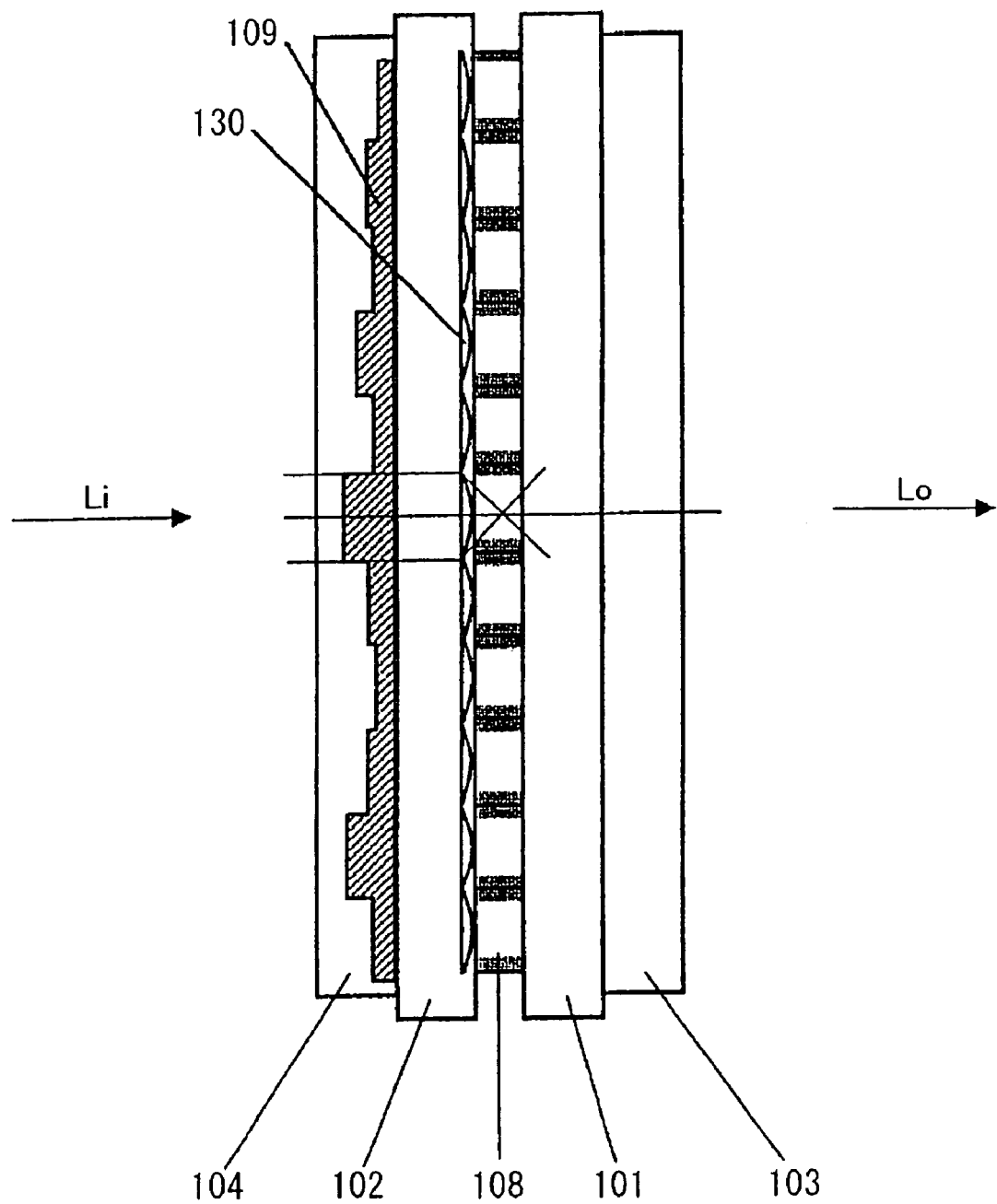
FIG. 22 is a cross-sectional view showing an example of forming a phase shift structure on a glass dust shield and forming a micro-lens structure on a counter substrate in the transmission-type liquid crystal panel illustrated in FIG. 19.

In the embodiment shown in FIG. 20, surface of the counter substrate 102 at the TFT substrate side is formed with the phase shift structure 109 and the micro-lens structure 130, but similar effects can be obtained even if forming only the phase shift structure 109 on the surface of the counter substrate 102 at the glass dust shield 104 side as illustrated in FIG. 21 or at the exit surface (or entrance surface) of the glass dust shield 104 as illustrated in FIG. 22.

An ordinary projector LCD panel receives light at the counter substrate side and outputs it from the TFT substrate side, but even if configured with light entering the TFT substrate side and exiting from the counter substrate side, a similar effect would be obtained by similarly forming a micro-lens structure according to the present invention at the entrance side substrate and forming a phase shift structure at either an entrance surface or an exit surface of an entrance side substrate or an exit side substrate.

Further, in the present embodiment, an example is shown of forming a phase shift structure at the exit surface of a projection-type LCD panel, but the invention may also be applied to other projection-type (or transmission-type) image display devices.

As described above, the image display device according to the more advanced version of the present invention, as a basic configuration, is provided with a periodic structure of pixels 108 arranged in a matrix and substrates 101, 102 supporting the pixels, modulates light entering from an entrance surface in pixel units, and emits the same from an exit surface. It is characterized by forming a phase shift structure 109 for randomly changing the phase of light and a micro-lens structure 130 on, for example, the surface of the substrate 101 through which the light passes. The phase shift structure 109 is comprised of a relief structure formed by etching to random depths the surface of the substrate 101 through which light passes. The phase shift structure 109 is formed by, for example, photolithography. Preferably, the phase shift structure 109 has a relief structure differing in thickness in pixel units.

Reflection-type LCD Panel

Figure 23:
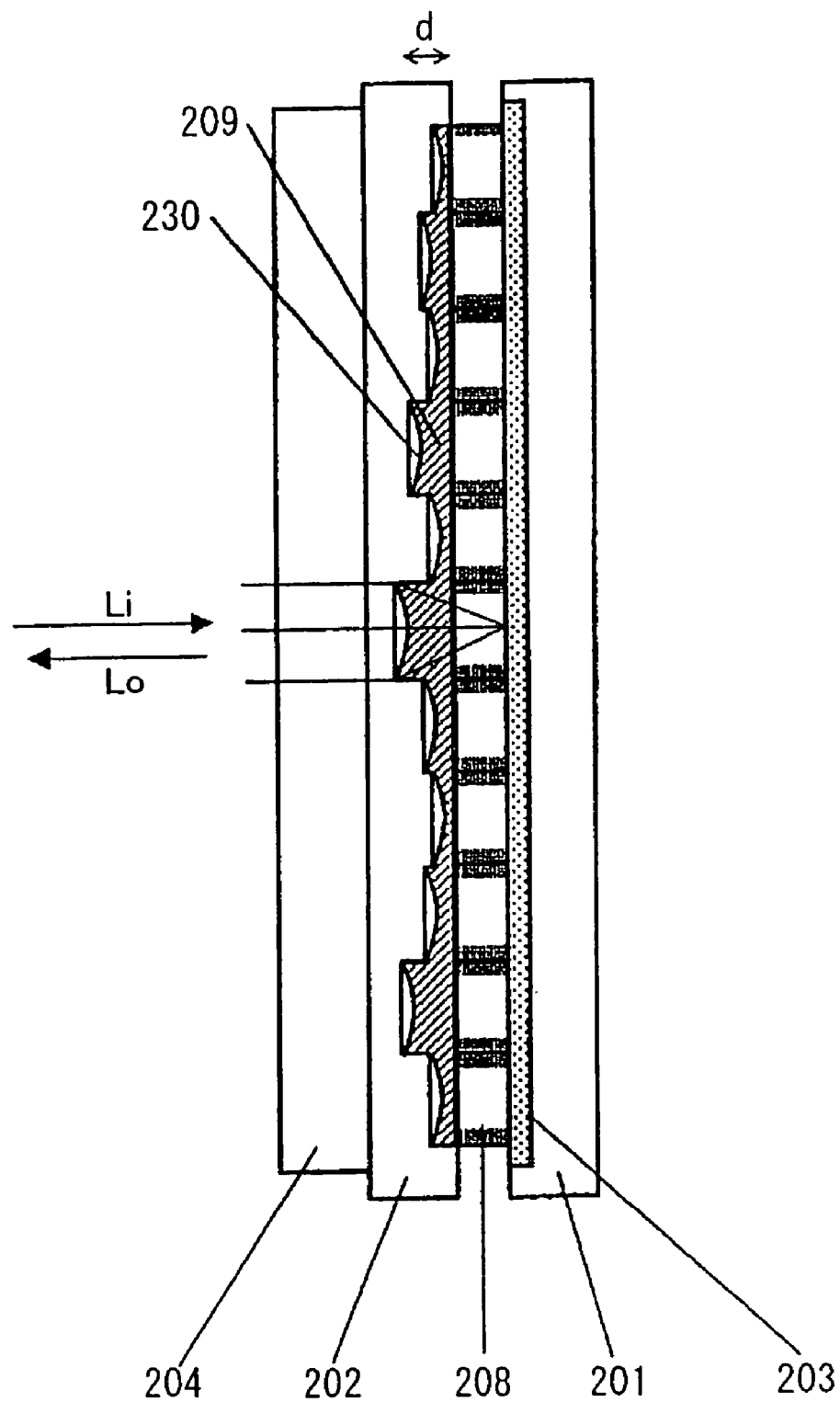
FIG. 23 is a view showing a reflection-type LCD panel as an embodiment of the present invention and shows an example of forming a phase shift structure and a micro-lens structure on a counter substrate.

The embodiments shown in FIGS. 20 to 22 are all transmission-type LCD panels. As opposed to this, the embodiment shown in FIG. 23 is a reflection-type LCD panel. That is, FIG. 23 is a view showing a reflection-type LCD panel as an embodiment of the present invention and shows an example of forming a phase shift structure 209 and a micro-lens structure 230 on a counter substrate 202.

Such a reflection-type liquid crystal panel is used for an LCD projector.

As shown in FIG. 23, the present reflection-type LCD panel is comprised of a TFT substrate 201, counter substrate 202, reflection layer 203 on the TFT substrate, glass dust shield 204, etc. Alternatively there is also a case where the TFT substrate is located at the glass dust shield 204 side.

In the embodiment illustrated in FIG. 23, the surface of the counter substrate 202 at the light exit side (opposite side to the glass dust shield 204) is formed with a phase shift structure 209 and a micro-lens structure 230 corresponding to the pixels 208. A pixel 208 has an aperture area where a pixel electrode reflecting entering light is located and a non-aperture area where a circuit pattern for switching and driving the pixel electrode is located. In the prior art, the non-aperture area where the circuit pattern is formed did not reflect light and thereby led to a drop in the efficiency of utilizing light. Therefore, in this embodiment, micro-lenses 230 are formed in an array corresponding to the individual pixels 208 on the surface of the counter substrate 202 at the TFT substrate 201 side so as to converge light on the pixels 208, so absorption by pixel driving circuit patterns can be prevented. At this time, the outer shapes of the micro-lenses 230 are equal to the outer shapes of the pixels 208, and the pitch of the micro-lens array and the pitch of the pixels are equal. Further, the focal positions of the micro-lenses are at the centers of the pixels on the reflection layer surface, so the reflected light is again converted to parallel light by the micro-lenses and output.

The surfaces of the pixel areas 208 of the counter substrate 202 (surface opposite to glass dust shield 204) are etched or formed with films to any depth or thickness between d=0 to d=$\lambda/|N1-N2|$ in unit structures of the same pitch as the pixel structural units 208. d is the depth, $\lambda$ the central wavelength, N1 the substrate refractive index at the central wavelength, and N2 the refractive index of the phase shift structure at the central wavelength. When the phase shift structure is filled with a transparent resin or the like, for example N2=1.4 and d is any value between 0 to 2750 nm. At this time, the light passing through the pixels is given any phase difference between $$2\times 2\pi/\lambda \times d \times |N1-N2|=0 \text{ to } 2\pi$$

with respect to an area where the etching depth or film formation thickness is zero. Therefore, in the same way as the case of a transmission-type LCD panel, a random phase shift structure is formed ant the occurrence of high-order diffracted light by the pixel periodic structure can be prevented.

Note that the phase shift structure drawn in FIG. 23 is drawn emphasized in depth d, however the actual depth d of the phase shift structure is about 1 µm at the maximum when the medium N2 is air, so the differences of focusing points for the micro-lenses are not of a level posing a problem at all. As described above, by forming a phase shift structure 209 and a micro-lens structure 230 on the surface of the counter substrate 202 at the TFT substrate 201 side, the occurrence of diffracted light caused by the pixel periodic structure is prevented and simultaneously the blocking of light by circuit patterns for driving pixels is prevented and thereby an increase of the efficiency of utilizing light is contributed to.

Figure 24:
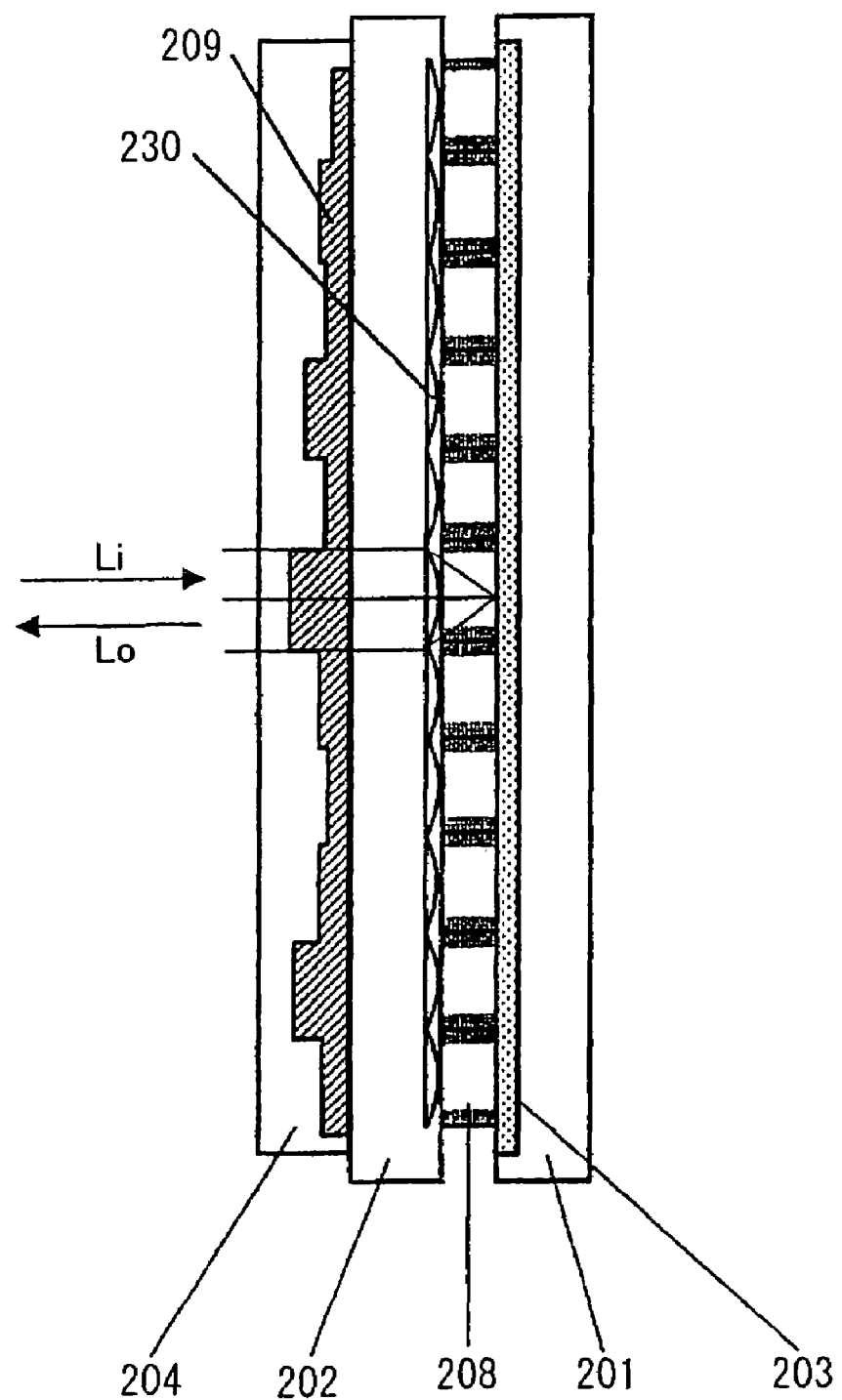
FIG. 24 is a cross-sectional view showing a reflection-type LCD panel as another embodiment of the present invention and showing an example of forming a phase shift structure on a glass dust shield and forming a micro-lens structure on a counter substrate.

FIG. 24 is a cross-sectional view showing a reflection-type LCD panel as an other embodiment of the present invention and shows an example of forming a phase shift structure 209 on a glass dust shield 204 and forming a micro-lens structure 230 on a counter substrate 202.

In the embodiment shown in FIG. 23, the surface of the counter substrate 202 is formed with a phase shift structure 209 and a micro-lens structure 230, but a similar effect is obtained even if forming the micro-lens structure 230 on the surface of the counter substrate 202 and forming the phase shift structure 209 on the surface of the glass dust shield 204 as illustrated in FIG. 24. Further, in the present embodiment, the example is shown of applying a phase shift structure to a reflection-type LCD panel, but the invention can also be applied to other reflection-type image display devices. For example, there are a LCOS (Liquid Crystal On Silicon), a DLP (Digital Light Processor), a DMD (Digital Mirror Device), or the like.

Method of Producing Micro-lens Array

Figure 25A:
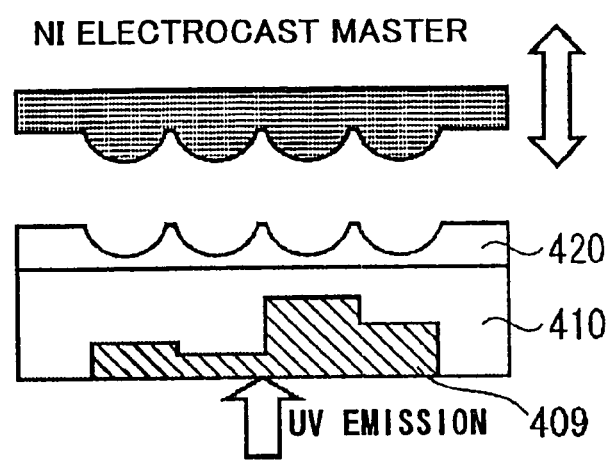
FIGS. 25A and 25B are process charts showing an embodiment of a method of forming a micro-lens structure used in an LCD panel according to the present invention.
Figure 25B:
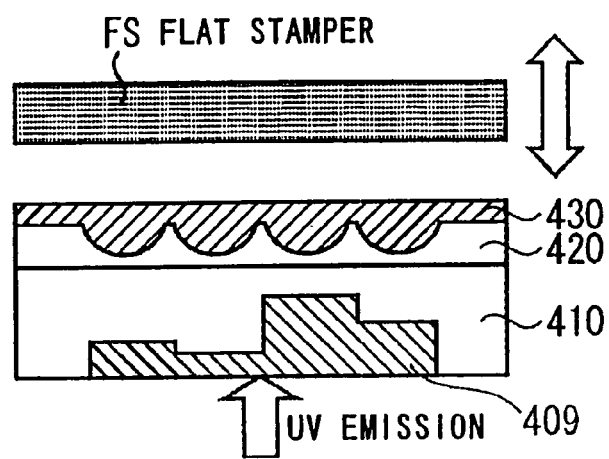

FIGS. 25A and 25B are process charts showing a method of production of a micro-lens array according to the present invention and uses the stamper method. First, as shown in FIG. 25A, an Ni electrocast master is pressed on a first optical resin layer 420 formed in advance on a surface of a glass substrate 410 to transfer a micro-lens surface. The first optical resin layer 420 is comprised of a UV resin with a low refractive index. Next, UV light of a wavelength of near 365 nm is irradiated with 3000 mJ energy from the back side of the glass substrate 410 to cure the UV resin. Note that a phase shift structure 409 is formed in advance on the back side of the glass substrate 410.

Next, as shown in FIG. 25B, the relief of the micro-lens surface is buried with a resin having a second refractive index and the surface is flattened by a flat stamper FS to form a second optical resin layer 430. In the present embodiment, high refractive index UV resin is dropped to bury the relief of the micro-lens surface, then the surface is pressed by the flat stamper FS to flatten the surface. In this state, UV light is irradiated to fix the flattened surface of the second optical resin layer 430. Note that instead of dropping liquid resin, it may also be supplied by spin coating. Due to this, a micro-lens array with a multilayer structure comprised of the first optical resin layer 420 with a low refractive index and the second optical resin layer 430 with a high refractive index is obtained.

Figure 26A:
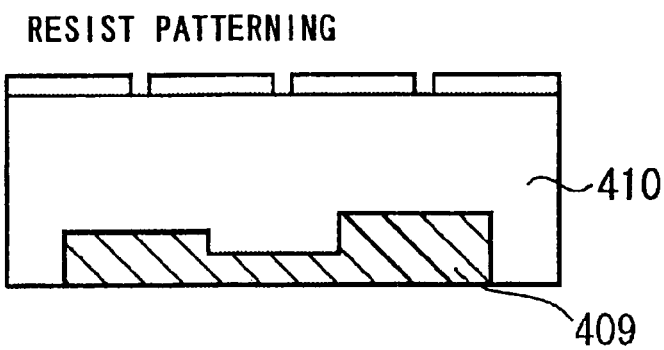
FIGS. 26A to 26C are process charts showing another embodiment of a method of forming a micro-lens structure used in an LCD panel according to the present invention.
Figure 26B:
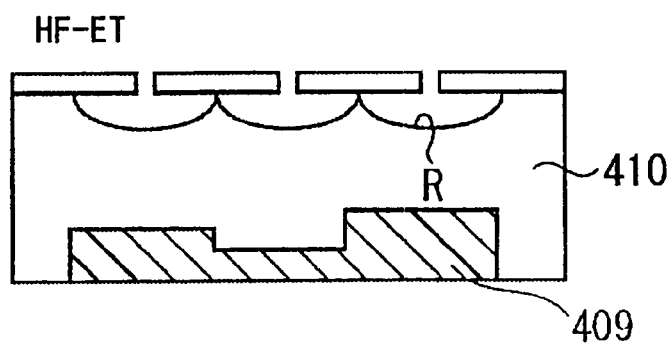
Figure 26C:
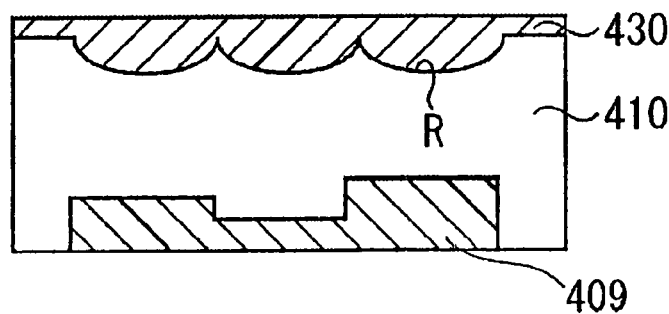

Next, referring to FIGS. 26A to 26C, a method of production of a micro-lens array using wet etching will be described. First, as shown in FIG. 26A, a silica-base glass substrate 410 is cleaned, then a resist is coated, exposed, and developed to pattern it corresponding to the pixels. Note that the silica-base glass substrate 410 is formed in advance with a phase shift structure 409. Next, as shown in FIG. 26B, the silica-base glass substrate 410 is isotropically etched via the resist to form spherically shaped lens surfaces R. Note that instead of a resist, a metal with excellent chemical resistance, polycrystalline silicon, amorphous silicon film, etc. can also be used as the mask material. As the etchant, a HF-based or BHF-based one can be applied. Next, as shown in FIG. 26C, the surface of the silica-base glass substrate 410 is coated with a transparent resin 430 with a different refractive index. The resin may be coated by spin-coating or spraying. The lens surface R formed into spherical shapes by wet etching is then buried in a resin which is then irradiated with UV light or heat treated to cause the resin to completely cure. An epoxy-based, acrylic-based, silicone-based, fluorine-based, or other resin may be used, but each is cured and solidified by ultraviolet ray treatment or heat treatment. Due to this, micro-lenses are created corresponding to the pixels.

Referring to FIGS. 27A to 27C, another example of a method of production of a micro-lens array using wet etching will be described. In this example, unlike the example described with reference to FIGS. 26A to 26C, the silica-base glass substrate is not formed with a phase shift structure—the cover glass side is formed with a phase shift structure by another step. First, as shown in FIG. 27A, a silica-base glass substrate is cleaned, then a resist is coated, exposed, and developed to pattern it corresponding to the pixels. Next, as shown in FIG. 27B, the silica-base glass substrate 410 is isotropically etched via the resist to form spherically shaped lens surfaces R. Note that instead of a resist, a metal with excellent chemical resistance, polycrystalline silicon, amorphous silicon film, etc. can also be used as the mask material. As the etchant, a HF-based or BHF-based one can be applied. Next, as shown in FIG. 27C, the surface of the silica-base glass substrate 410 is covered with a cover glass and a transparent resin with a different refractive index is filled in the clearance between the two. The resin may be vacuum injected. Alternatively, spin-coating or spraying may be used. The lens surface R formed into spherical shapes by wet etching is then buried in a resin which is then irradiated with UV light or heat treated to cause the resin to completely cure. An epoxy-based, acrylic-based, silicone-based, fluorine-based, or other resin may be used,. but each is cured and solidified by ultraviolet ray treatment or heat treatment. Due to this, micro-lenses are created corresponding to the pixels. Finally, as shown in FIG. 27D, the cover glass is polished, then an ITO or other transparent electrode is formed on the surface to obtain a counter substrate. Afterward, while a process is not shown, a drive substrate formed with pixel electrodes or thin film transistors and the counter substrate are bonded together and liquid crystal is filled in the clearance between the two to complete an active-matrix type liquid crystal display device.

Figure 28:
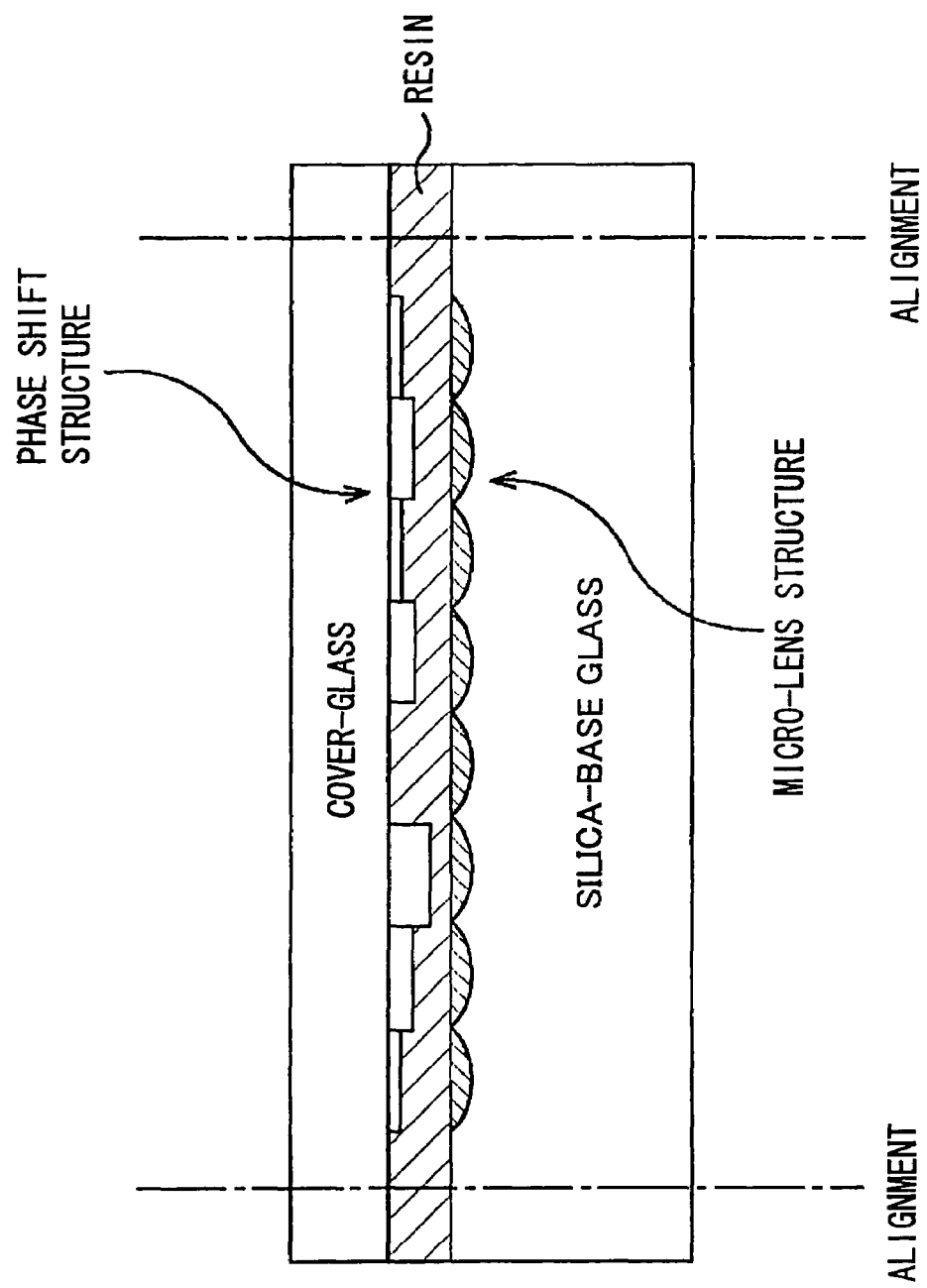
FIG. 28 is a schematic cross-sectional view showing a state of combination of a micro-lens structure and phase shift structure as an embodiment of the present invention.

FIG. 28 is a schematic cross-sectional view showing an example of a substrate for an active-matrix display apparatus stacking and combining a separately prepared phase shift structure and micro-lens structure. As shown in FIG. 28, a cover glass is formed in advance with a phase shift structure forming a random diffraction grating. The method of forming this phase shift structure may use the process shown in FIG. 11 to FIG. 18. The heights of the diffraction grating corresponding to the individual pixels are suitably set and changed in accordance with the resin refractive index, difference of a substrate refractive index, or the like. On the other hand, a silica-base glass substrate is formed in advance with a micro-lens structure. The micro-lens structure can be formed, for example, by the process shown in FIGS. 27A to 27D. The fine micro-lenses are integrally formed divided for every pixel. The cover glass formed in advance with the phase shift structure and the silica-base glass substrate formed in advance with the micro-lens structure are aligned and bonded together with a resin. In the case of the present embodiment, the resin used for bonding the cover glass and the silica-base glass substrate has a refractive index of approximately 1.60. A acrylic-based, epoxy-based, or urethane-based resin can be used. Further, when reversing the relief of the phase shift structure, a fluorine-based or silicone-based resin etc. is used as the bonding resin. In the present example, the diffraction grating is formed at just the cover glass and the height positions of the micro-lenses do not need to be adjusted, so it becomes possible to combine only good products of the phase shift structure and the micro-lens structure, which lead to improvement of yield.

As explained above, according to the first aspect of the present invention, by forming a phase shift structure, occurrence of high-order diffracted light can be reduced and occurrence of flare in a liquid crystal projector can be prevented. Further, by forming a phase shift structure, the amount of 0th order light (non-diffracted light) inherently required is increased, which contributes to improvement of luminance.

According to the second aspect of the present invention, by forming a phase shift structure, occurrence of high-order diffracted light can be reduced, and occurrence of flare in a liquid crystal projector can be prevented. Further, by forming a phase shift structure, the amount of 0th order light (non-diffracted light) inherently required is increased, which contributes to improvement of luminance. Moreover, by forming a micro-lens structure, blocking of light due to the pixel switching circuit area is prevented, which contributes to improvement of luminance of a projected image.

INDUSTRIAL APPLICABILITY

An LCD projector using an LCD panel of the present invention as an image modulation means can be applied for an image display in a variety of fields.

The invention claimed is:
1. A method of producing an image display device used for an image projection apparatus comprising the steps of:
forming pixels arranged in a matrix over a substrate, and
forming a phase shift structure over a surface of said substrate for randomly changing the phase of a light as the light passes therethrough in order to reduce a high-order diffracted light.

2. A method of producing an image display device used for an image projection apparatus as in claim 1, wherein said phase shift structure is formed by etching a surface of said substrate to random depths.

3. A method of producing an image display device used for an image projection apparatus as in claim 1, wherein said phase shift structure is formed by depositing a dielectric transparent film over a surface of said substrate to random thicknesses.

4. A method of producing an image display device used for an image projection apparatus as in claim 1, wherein said phase shift structure is formed by a photolithography process.

5. A method of producing an image display device used for an image projection apparatus as in claim 1, wherein said phase shift structure is formed such that there are substantially no changes in height in areas of the phase shift structure which oppose the portion of a pixel through which the light passes.

6. A method of producing an image display device used for an image projection apparatus as in claim 1, characterized in that a micro-lens structure is further formed over a surface of said substrate for converging said light toward said pixels.

7. A method of producing an image projection apparatus comprising a light source, a display panel, and an expansion projection optical system arranged in that order along an optical axis, said method comprising the steps of:
   providing a display panel having a periodic structure of pixels arranged in a matrix and a substrate supporting said plurality of pixels, and
   forming a phase shift structure for randomly changing the phase of a light as the light passes through it.

8. A method of producing an image display device used for an image projection apparatus as in claim 7, characterized in that a micro-lens structure is further formed over a surface of said substrate for converging said light toward said pixels.

9. A method of producing an image display device used for an image projection apparatus having a periodic structure of pixels arranged in a matrix and a substrate supporting said plurality of pixels, said method comprising the step of:
   forming a phase shift structure for randomly changing the phase of an incoherent light as the light passes therethrough.

10. A method of producing an image display device used for an image projection apparatus as in claim 9, wherein said phase shift structure is formed such that substantially all of the light passing through an individual pixel experiences substantially the same amount of phase shift.

* * * * *